(12) United States Patent
Napau et al.

(10) Patent No.: US 11,077,774 B2
(45) Date of Patent: Aug. 3, 2021

(54) HIGH TORQUE LOAD POWER ROTARY RECLINER WITH ANTI-BACK DRIVE CAPABILITY AND REDUCED BACKLASH FOR CAR SEAT

(71) Applicant: FISHER & COMPANY, INCORPORATED, St. Clair Shores, MI (US)

(72) Inventors: Mircea Napau, Sterling Heights, MI (US); Doina Napau, Sterling Heights, MI (US); Ileana Dacia Napau, Cugir (RO); Ioan Napau, Rochester Hills, MI (US)

(73) Assignee: FISHER & COMPANY, INCORPORATED, St. Clair Shores, MI (US)

( * ) Notice: Subject to any disclaimer, the term of this patent is extended or adjusted under 35 U.S.C. 154(b) by 0 days.

(21) Appl. No.: 16/987,676

(22) Filed: Aug. 7, 2020

(65) Prior Publication Data
US 2021/0053470 A1 Feb. 25, 2021

Related U.S. Application Data

(60) Provisional application No. 62/889,097, filed on Aug. 20, 2019.

(51) Int. Cl.
*B60N 2/02* (2006.01)
*B60N 2/22* (2006.01)

(52) U.S. Cl.
CPC ......... *B60N 2/2227* (2013.01); *B60N 2/0232* (2013.01)

(58) Field of Classification Search
CPC .. B60N 2/2252; B60N 2/2254; B60N 2/0232; B60N 2205/50; B60N 2/2227
See application file for complete search history.

(56) References Cited

U.S. PATENT DOCUMENTS

| | | | |
|---|---|---|---|
| 7,264,566 B2 | 9/2007 | Dill et al. | |
| 7,285,067 B2 | 10/2007 | Krambeck et al. | |
| 7,354,108 B2 | 4/2008 | Matsumoto et al. | |
| 8,585,149 B2* | 11/2013 | Villarroel | B60N 2/236 297/367 R |
| 8,616,646 B2 | 12/2013 | Deegener et al. | |
| 8,708,412 B2 | 4/2014 | Berndtson et al. | |
| 9,610,865 B2* | 4/2017 | Chang | B60N 2/0232 |
| 10,183,594 B2 | 1/2019 | Kim et al. | |
| 10,421,375 B2 | 9/2019 | Sakurai | |
| 2006/0025270 A1 | 2/2006 | van de Geer et al. | |
| 2009/0224588 A1* | 9/2009 | Matsumoto | B60N 2/2254 297/362 |

(Continued)

*Primary Examiner* — Shin H Kim
(74) *Attorney, Agent, or Firm* — Harness, Dickey & Pierce, P.L.C.

(57) ABSTRACT

A recliner mechanism includes first, second and third locking plates and a fastener. The first locking plate has a first inner diametrical surface having first teeth formed thereon. The second locking plate has a second inner diametrical surface having second teeth formed thereon. One or both of the first and second locking plates may include an aperture extending therethrough. The third locking plate has an outer diametrical surface having third teeth formed thereon. Some of the third teeth are meshingly engaged with some of the first teeth and some of the second teeth. The fastener may extend through the aperture and is attached to one of a seatback and a seat bottom.

26 Claims, 36 Drawing Sheets

(56) References Cited

U.S. PATENT DOCUMENTS

| | | | |
|---|---|---|---|
| 2012/0001471 A1* | 1/2012 | Wei | B60N 2/2252 297/362 |
| 2013/0313879 A1* | 11/2013 | Bedro | B60N 2/2252 297/362 |
| 2015/0246625 A1* | 9/2015 | Leconte | B60N 2/2252 297/361.1 |
| 2015/0258918 A1 | 9/2015 | Chang | |
| 2018/0279783 A1 | 10/2018 | Oishi | |

* cited by examiner

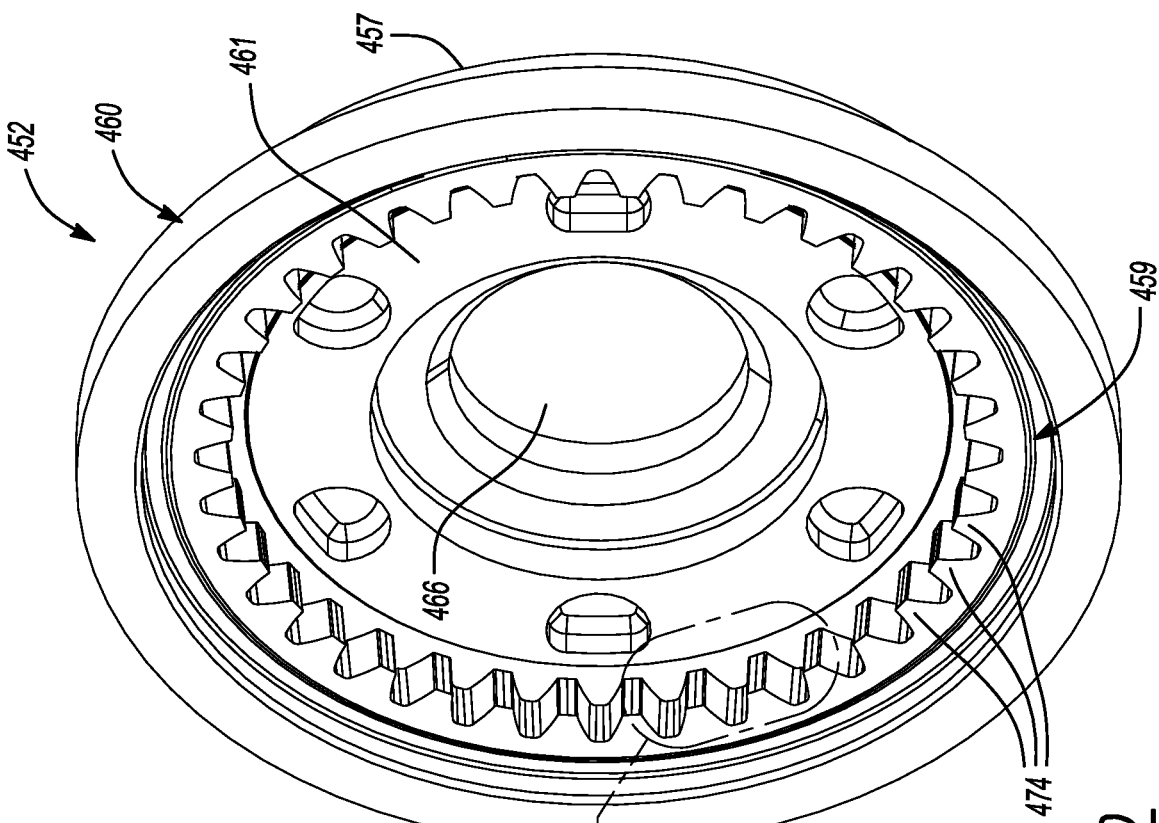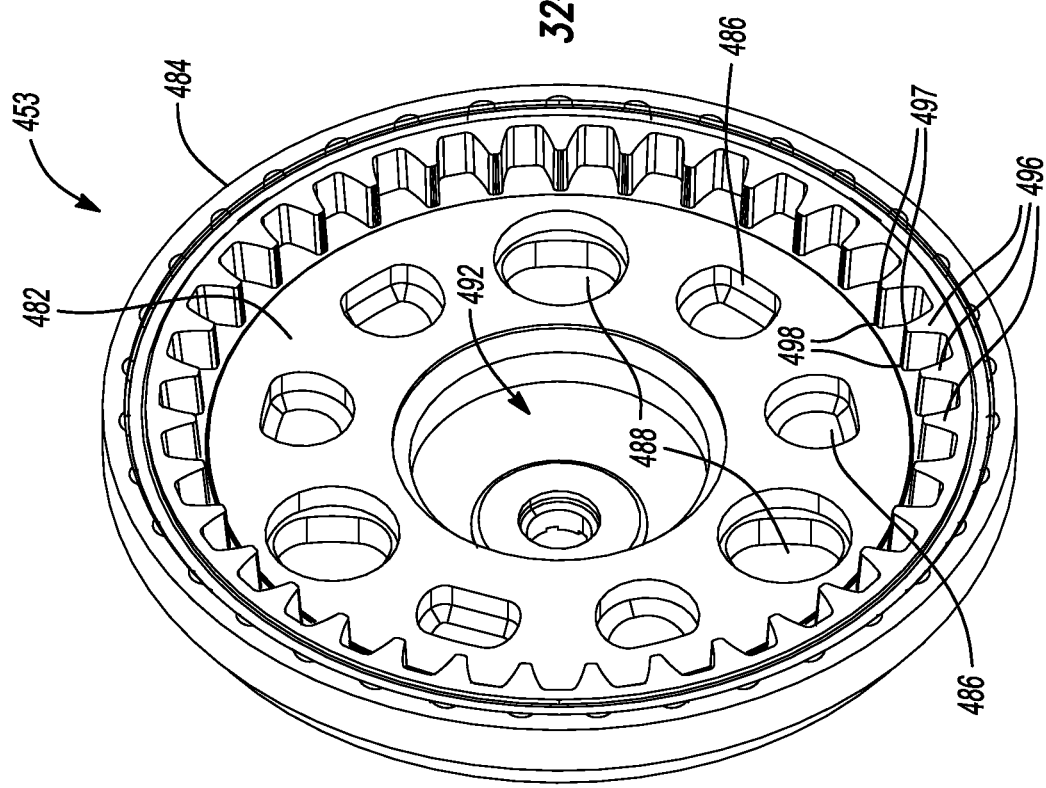
Fig-30

HIGH TORQUE LOAD POWER ROTARY RECLINER WITH ANTI-BACK DRIVE CAPABILITY AND REDUCED BACKLASH FOR CAR SEAT

CROSS-REFERENCE TO RELATED APPLICATIONS

This application claims the benefit of U.S. Provisional Application No. 62/889,097, filed on Aug. 20, 2019. The entire disclosure of the above application is incorporated herein by reference.

FIELD

The present disclosure relates to a recliner mechanism for a car seat assembly, and more specifically, to a high torque load power rotary recliner with anti-back drive capability and reduced backlash for a car seat.

BACKGROUND

This section provides background information related to the present disclosure and is not necessarily prior art.

Generally speaking, gear drive mechanisms used in automotive interior actuators can perform several useful functions: reduce or increase the speed, multiply or decrease the torque, and reverse the direction of rotation. In one example, automotive recliner mechanisms are gear drives that adjust a back seat position relative to a seat bottom. Power recliner mechanisms serve to adjust and secure the angular position of a vehicle back seat relative to the seat bottom, process in which the electric motor input speed is reduced while increasing its input torque. Some of the most important requirements for automotive recliner mechanisms include: the range of reduction ratio, the range of output torque, size, weight, efficiency, the level of noise produced by the recliner mechanism, shock load capability, cost, durability, packaging size, and the amount of backlash. For some applications, such as those used in adjusting and maintaining the angular adjusted position of a back seat relative to the seat bottom, a special requirement called anti-back drive capability is also required. The anti-back drive capability may also be referred to as "non-back drive capability," "self-locking capability," or "anti-regression capability." Gear drives transfer the high speed and low torque rotation of an electric motor input shaft to low speed and high torque rotation of an output shaft, in either, a clockwise (CW) or a counter-clockwise (CCW) direction of rotation. For gear drives with anti-back drive capability, any attempt to transfer torque from the output shaft back to the input shaft by applying an external load to the output shaft (e.g. external reaction forces in the case of a crash accident, etc.) is prevented.

Planetary gear trains present certain advantages over the ordinary gear trains when used in recliner mechanisms because of their small size, low weight, high-speed ratio and high efficiency. The present disclosure provides a rotary recliner mechanism of double-planetary gear type. When a conventional rotary recliner mechanism is in a locked position, tolerances between components of the rotary recliner mechanism may allow some degree of angular movement of the back seat relative to the seat bottom. In particular, the proposed rotary recliner mechanism is designed to be an anti-back drive solution for all embodiment solutions explained.

The anti-back drive capability is a property present in some planetary gear trains with certain particular designs and specific values for their gear ratios. The planetary gear train self-locking capability is mainly due to the effects of combined friction and geometry of gear teeth. In other words, the anti-back drive capability is characterized by an internal state of the gear mechanism in which the external forces or torques generates internal forces due to the friction of great magnitude that impede the mechanism from moving in a certain direction. In particular, if a planetary gear train presents anti-back drive capability, an equilibrium of forces is possible on each of the members, so that the forces applied to the output member produce no moment upon it. For a rotary recliner mechanism with anti-back drive capability, this protects against damage to the input electric motor, while ensuring that the vehicle back seat maintains its angular position relative to seat bottom when the electric motor is not energized, or during a vehicle impact event.

Generally, during operation of a rotary recliner of planetary gear set type, a nominal value of backlash between the planetary external gear and internal ring gear teeth is typical. Backlash refers to the space between the meshing teeth of the first-gear of the gear set and the second-gear of the gear set. When the backlash becomes excessive, excess noise and vibrations can be produced when the gear set starts to rotate or reverses the direction of rotation. Without being bound to any particular theory, excess noise and vibration may be produced by the teeth of a pinion gear traveling freely through the space created by the backlash and then suddenly contacting the as-yet immobile teeth of the sector-gear. The larger the backlash, the larger values of noise and vibrations are noticed.

The reduction of backlash is a reliable way to reduce the noise and vibration produced by the two gear elements, and may improve the perceived quality of the rotary recliner mechanism incorporating planetary external and internal ring gears. One way to reduce the backlash is to increase the manufacturing and assembly accuracy of the gear teeth elements, allowing the production of the external and internal gears with only the nominal value of the backlash necessary for operation. However, increasing manufacturing and assembly accuracy result in an undesirable increase in production and assembly costs of the gear sets.

In a first embodiment of the present disclosure, the backlash between the rotary recliner planetary gear sets teeth is significantly reduced by using an elastic element i.e. an omega-shape spring, connected with two shaped wedge elements working against a special inside shape of an eccentric element. Due to the insertion of an eccentric element between the recliner planetary gears, an eccentricity is created between the central axis of internal gear, which forms the pivoting axis of the assembly, and the central axis of planetary external gear. This eccentricity ensures, form mechanical point of view, that the external planetary gear is forced into fixed output internal gear in an extension of the direction of the eccentricity. In order to ensure the gears mesh engagement, between the above-mentioned gears without any play, two wedge segments are actuated upon by an omega-shape spring-loaded element, such that they are forced away from one another, peripherally inside the eccentric part, in a direction of increased eccentricity value. The above-described arrangement ensures that the back seat, rigid-connected to the output internal gear is held in place, free from backlash, the forces exerted by the back seat being radially absorbed by the above-mentioned wedge segments. In other words, no adjustment forces are exerted on them. The tension exerted by the omega-shaped spring on the wedge segments can be relieved only by peripheral forces acting on the wedge segments. In order to introduce this type of adjusting motion on the eccentric, a driving shaft is provided.

In a second embodiment of the present disclosure, the backlash between the rotary recliner planetary gears teeth is completely eliminated using a conical involute gear system type. The conical involute gears are involute gears, which have tapered tooth thickness, tapered root and tapered outside diameters. Each transverse tooth profile represents (approximately) a spur gear with different degrees of addendum modification and tip radius. The backlash is eliminated during the assembly process by moving the external planetary conical gear in an axial direction into mesh with internal planetary conical gear without changing the gear-pair center distance. To obtain and maintain the zero backlash, some of elastic elements i.e. wavy springs, facilitate the necessary axial adjustment with a pre-defined axial force. These elastic elements are located between the two external planetary gears. Due to the very low operation speed, the speed fluctuation in the gear meshing process due to involvement of the elastic elements is estimated to be minimal.

In a third embodiment of the present disclosure, the backlash between the rotary recliner planetary gears teeth is completely eliminated using a conical involute gear system type. The conical involute gears are involute gears, which have tapered tooth thickness, tapered root and tapered outside diameters. Each transverse tooth profile represents (approximately) a spur gear with different degrees of addendum modification and tip radius. The backlash is eliminated during the assembly process by moving the external planetary conical gear in axial direction into mesh with internal planetary conical gear without changing the gear-pair center distance. To obtain and maintain the zero backlash, some of elastic elements i.e. wavy springs, facilitate the necessary axial adjustment with a pre-defined axial force. These elastic elements are located between the recliner fixed internal gear and the two planetary gears rigid connected together. Due to the very low operation speed, the speed fluctuation in the gear meshing process due to involvement of the elastic elements is estimated to be minimal.

Typically, the conventional power rotary recliners are designed and manufactured for continuously adjusting vehicle back seat angular positioning relative to the seat bottom, while the seat back hinge requirement is to withstand a predetermined torque load, in case of a vehicle potential collision. The current disclosure increases the torque load that the seat back hinge is able to withstand.

SUMMARY

This section provides a general summary of the disclosure, and is not a comprehensive disclosure of its full scope or all of its features.

In one form, the present disclosure provides a recliner mechanism including a first locking plate, a second locking plate, and a third locking plate. The first locking plate has a first inner diametrical surface having first teeth formed thereon. The second locking plate has a second inner diametrical surface having second teeth formed thereon. One or both of the first and second locking plates may include a first aperture extending therethrough. The third locking plate has an outer diametrical surface having third teeth formed thereon. Some of the third teeth are meshingly engaged with some of the first teeth and some of the second teeth. A fastener may extend through the first aperture and may be attached to one of a seatback and a seat bottom.

In some configurations of the recliner mechanism of the above paragraph, the second locking plate includes a plate body and a rim extending around the plate body. The second teeth are formed on the second inner diametrical surface of the rim and the first aperture extends through the plate body.

In some configurations of the recliner mechanism of any one or more of the above paragraphs, the plate body includes projections extending therefrom and received in openings of a bracket attached to the one of the seatback and the seat bottom.

In some configurations of the recliner mechanism of any one or more of the above paragraphs, the first aperture is disposed between two of the projections.

In some configurations of the recliner mechanism of any one or more of the above paragraphs, the first fastener includes a locking portion, an anti-rotational portion and a flange portion. The anti-rotational portion and the locking portion are disposed in the first aperture.

In some configurations of the recliner mechanism of any one or more of the above paragraphs, the locking portion and the flange portion cooperate with the second locking plate to prevent axial movement of the first fastener.

In some configurations of the recliner mechanism of any one or more of the above paragraphs, the first fastener further includes a threaded portion that extends from the flange portion and is threadably secured to the one of the seatback and the seat bottom.

In some configurations of the recliner mechanism of any one or more of the above paragraphs, the first aperture includes a first section having a first shape and a second section having a second shape that is different from the first shape. The locking portion is received in the first section and the anti-rotational portion is received in the second section.

In some configurations of the recliner mechanism of any one or more of the above paragraphs, the locking portion is circular-shaped and is received in the first section where the first shape is circular. The anti-rotational portion is a trilobular-shaped and is received in the second section where the second shape is trilobular.

In some configurations of the recliner mechanism of any one or more of the above paragraphs, the second locking plate includes a second aperture extending therethrough. A second fastener extends through the second aperture and is attached to one of the seatback and the seat bottom.

In another form, the present disclosure provides a recliner mechanism for a seat assembly having a seatback and a seat bottom. The recliner mechanism includes a first locking plate, a second locking plate, a third locking plate and a first fastener. The first locking plate has a first inner diametrical surface having first teeth formed thereon. The first locking plate includes a first aperture extending therethrough. The second locking plate has a second inner diametrical surface having second teeth formed thereon. The third locking plate has an outer diametrical surface having third teeth formed thereon. Some of the third teeth are meshingly engaged with some of the first teeth and some of the second teeth. The first fastener extending through the first aperture and attached to one of the seatback and the seat bottom. The first fastener includes an anti-rotational portion that is disposed in the first aperture and prevents the first fastener from rotating relative to the first locking plate.

In some configurations of the recliner mechanism of the above paragraph, the first fastener extends through a second aperture in the second locking plate.

In some configurations of the recliner mechanism of either of the above paragraphs, the first locking plate includes a plate body and a rim extending around the plate body. The first aperture extends through the plate body.

In some configurations of the recliner mechanism of any one or more of the above paragraphs, the first fastener further includes a locking portion, a threaded portion and a flange portion disposed between the locking portion and the threaded portion. The locking portion is disposed in the first aperture.

In some configurations of the recliner mechanism of any one or more of the above paragraphs, the locking portion and the flange portion cooperate with the plate body to prevent axial movement of the first fastener.

In some configurations of the recliner mechanism of any one or more of the above paragraphs, the first aperture includes a first section having a first shape and a second section having a second shape that is different from the first shape. The locking portion is received in the first section and the anti-rotational portion is received in the second section.

In some configurations of the recliner mechanism of any one or more of the above paragraphs, the locking portion is circular-shaped and is received in the first section where the first shape is circular, and wherein the anti-rotational portion is a trilobular-shaped and is received in the second section where the second shape is trilobular.

In some configurations of the recliner mechanism of any one or more of the above paragraphs, the second locking plate includes a second aperture extending therethrough. A second fastener extends through the second aperture and is attached to the other of the seatback and the seat bottom.

In some configurations of the recliner mechanism of any one or more of the above paragraphs, the second locking plate includes a third aperture extending therethrough. A third fastener extends through the second aperture and is attached to the other of the seatback and the seat bottom.

In some configurations of the recliner mechanism of any one or more of the above paragraphs, the second fastener includes an anti-rotational portion that is disposed in the second aperture and prevents the second fastener from rotating relative to the second locking plate.

In some configurations of the recliner mechanism of any one or more of the above paragraphs, the anti-rotational portion is trilobular-shaped and is received in a trilobular-shaped section of the second aperture.

In yet another form, the present disclosure provides a recliner mechanism for a seat assembly having a seatback and a seat bottom. The recliner mechanism includes a first locking plate, a second locking plate, a locking ring assembly and an encapsulating ring. The first locking plate is coupled to one of the seatback and the seat bottom and has a first inner diametrical surface having first teeth formed thereon. The first locking plate defines a first recess. The second locking plate is coupled to the other of the seatback and the seat bottom and has a second inner diametrical surface having second teeth formed thereon. The locking ring assembly has a first outer diametrical surface having third teeth formed thereon. Some of the third teeth are meshingly engaged with some of the first teeth and some of the second teeth. The encapsulating ring is attached to one of the first and second locking plates and defines a second recess that cooperates with the first recess to form a slot. The second locking plate includes a protrusion that is received in the slot and is configured to traverse the slot.

In some configurations of the above paragraph, the first locking plate includes an intermediate section and a first rim extending at least partially around the intermediate section. The intermediate section has the first inner diametrical surface having first teeth and the first rim defines the first recess.

In some configurations of the recliner mechanism of any one or more of the above paragraphs, the second locking plate includes a plate body and a second rim extending around the plate body. The second rim has the second inner diametrical surface having the second teeth and the protrusion extends radially outwardly from a second outer diametrical surface of the second rim.

In some configurations of the recliner mechanism of any one or more of the above paragraphs, the encapsulating ring includes a body and a third rim extending radially outwardly from a periphery of the body. The third rim defines the second recess.

In some configurations of the recliner mechanism of any one or more of the above paragraphs, the protrusion contacts a first end wall of the slot to limit further rotation of the seatback relative to the seat bottom in a first rotational direction and contacts a second end wall of the slot to limit further rotation of the seatback relative to the seat bottom in a second rotational direction that is opposite the first rotational direction.

In some configurations of the recliner mechanism of any one or more of the above paragraphs, the slot is curved.

In some configurations of the recliner mechanism of any one or more of the above paragraphs, the second locking plate includes a plate body and a rim extending around the plate body. An aperture extends through the plate body.

In some configurations of the recliner mechanism of any one or more of the above paragraphs, a fastener extends through the aperture and is attached to the other of the seatback and the seat bottom.

In yet another form, the present disclosure provides a recliner mechanism that includes a first locking plate, a second locking plate, a locking ring assembly and a biasing ring. The first locking plate has a first inner diametrical surface having first teeth formed thereon. The second locking plate has a second inner diametrical surface having second teeth formed thereon. The locking ring assembly has first and second locking rings. The first locking ring has a first outer diametrical surface having third teeth formed thereon and the second locking ring has a second outer diametrical surface having fourth teeth formed thereon. Some of the third teeth are meshingly engaged with some of the first teeth and some of the fourth teeth are meshingly engaged with some of the second teeth. The biasing ring axially biases the first and second locking rings into engagement with the first and second locking plates, respectively.

In some configurations of the recliner mechanism of the above paragraph, the first locking ring has a body portion and a hub portion. The body portion has the first outer diametrical surface having the third teeth formed thereon.

In some configurations of the recliner mechanism of any one or more of the above paragraphs, the second locking ring is rotationally fixed to the hub portion of the first locking ring.

In some configurations of the recliner mechanism of any one or more of the above paragraphs, the biasing ring is disposed between the second locking plate and the locking ring assembly to bias the first and second locking plates in a same axial direction.

In some configurations of the recliner mechanism of any one or more of the above paragraphs, the biasing ring is disposed between the first and second locking rings to bias the first and second locking plates in opposite axial directions.

In some configurations of the recliner mechanism of any one or more of the above paragraphs, the first, second, third and fourth teeth each have a conical involute profile.

In some configurations of the recliner mechanism of any one or more of the above paragraphs, the first, second, third and fourth teeth are each tapered in a same axial direction.

In some configurations of the recliner mechanism of any one or more of the above paragraphs, the first and the third teeth are tapered in a first axial direction. The second and the fourth teeth are tapered in a second axial direction that is opposite of the first axial direction.

In some configurations of the recliner mechanism of any one or more of the above paragraphs, the biasing ring is a wavy spring washer.

In some configurations of the recliner mechanism of any one or more of the above paragraphs, the second locking plate includes a plate body and a rim extending around the plate body. An aperture extends through the plate body.

In some configurations of the recliner mechanism of any one or more of the above paragraphs, a fastener extends through the aperture and is attached to one of a seatback and a seat bottom.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 30 is a perspective view of the first and second locking plates of the recliner mechanism of FIG. 24;

Corresponding reference numerals indicate corresponding parts throughout the several views of the drawings.

DETAILED DESCRIPTION

Figure 1:
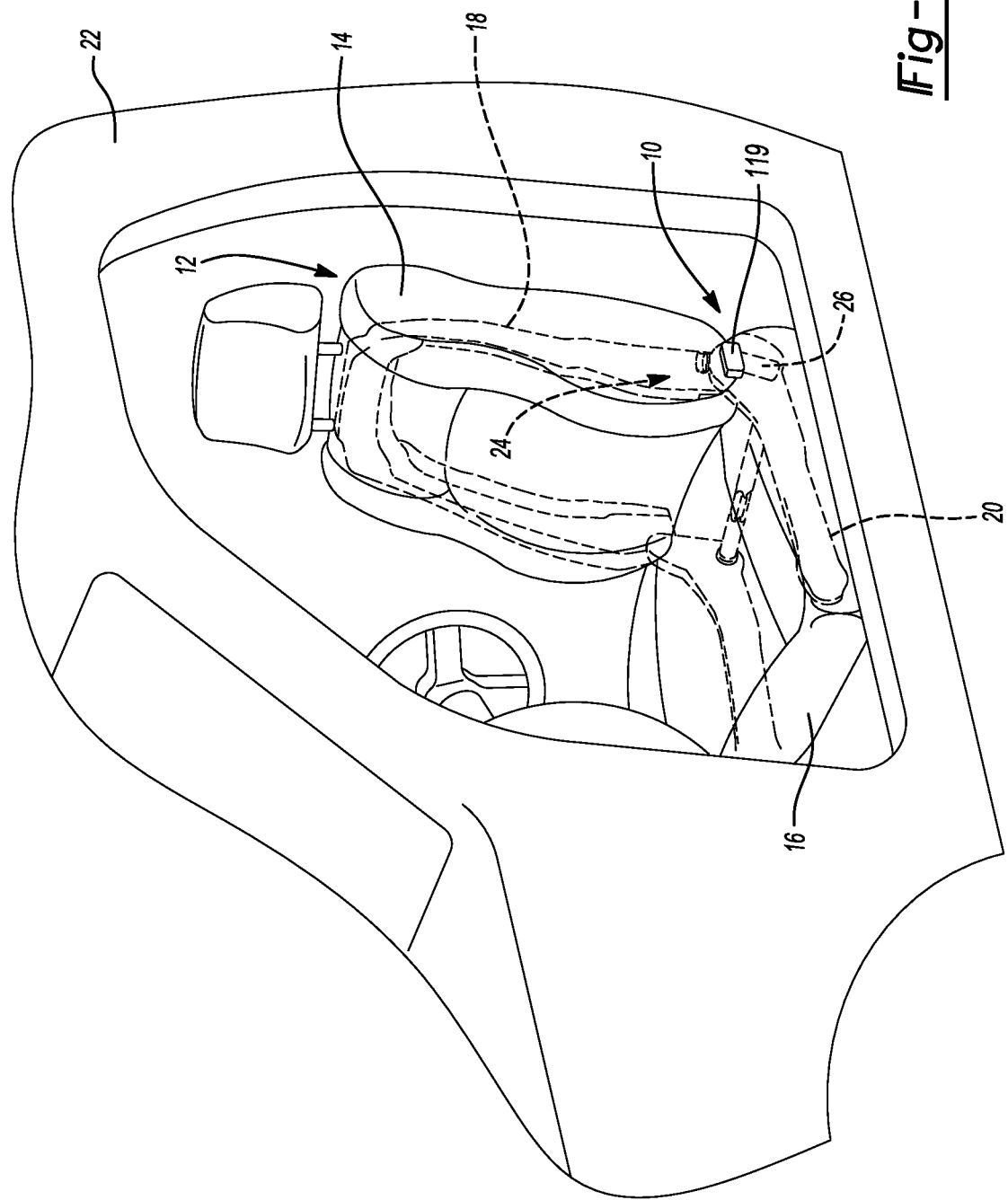
FIG. 1 is a partial perspective view of a vehicle having a seat incorporating a recliner assembly according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a recliner assembly 10 is provided that may be incorporated into a vehicle seat assembly 12 having a seatback 14 and a seat bottom 16. The seatback 14 and seat bottom 16 may include a seatback frame 18 and a seat bottom frame 20, respectively. The seat assembly 12 may be positioned in a vehicle 22, as shown in FIG. 1. The recliner assembly 10 may include a recliner mechanism 24 and a motor 26.

Figure 6:
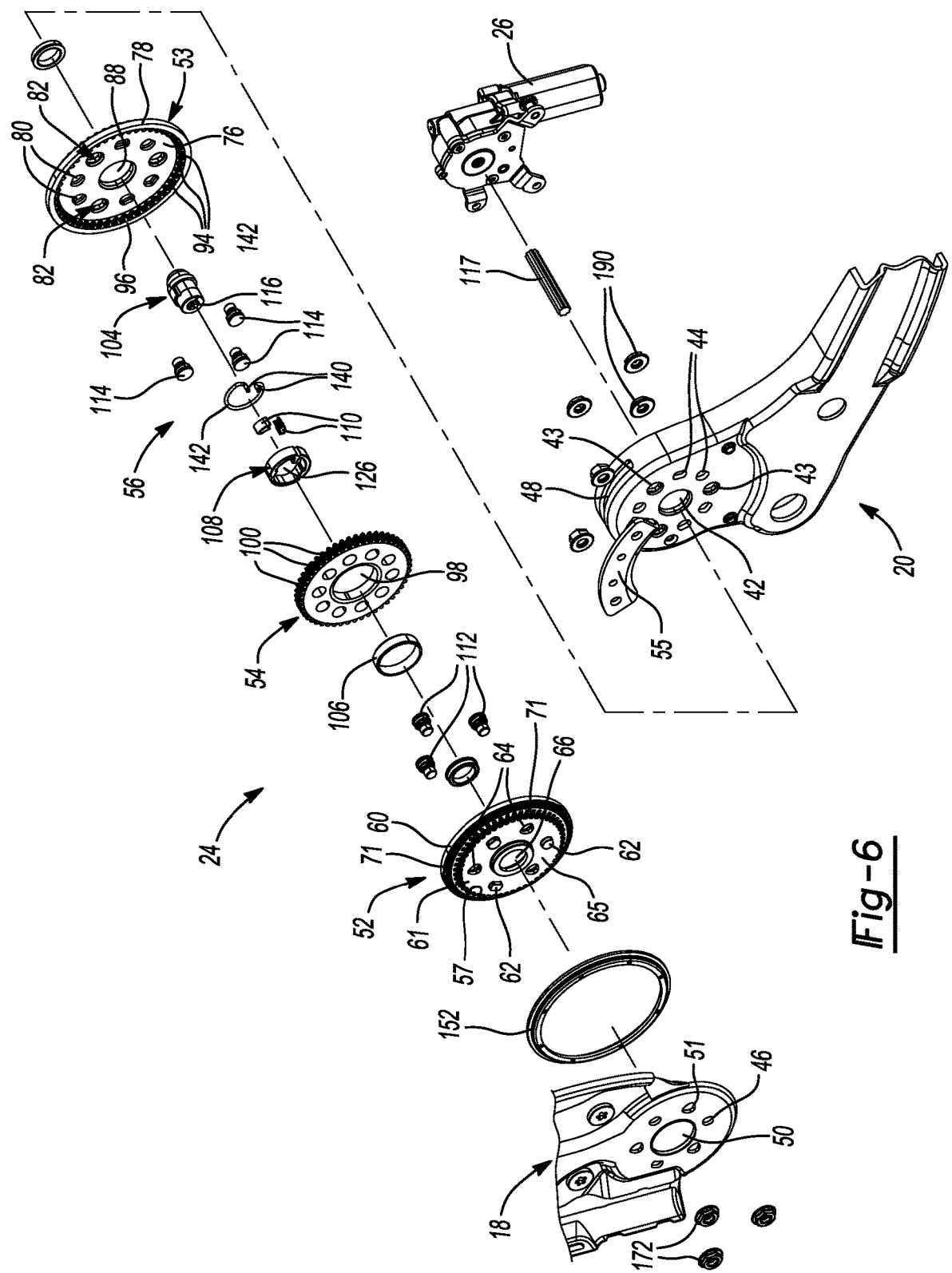
FIG. 6 is an exploded view of the recliner mechanism.
Figure 7:
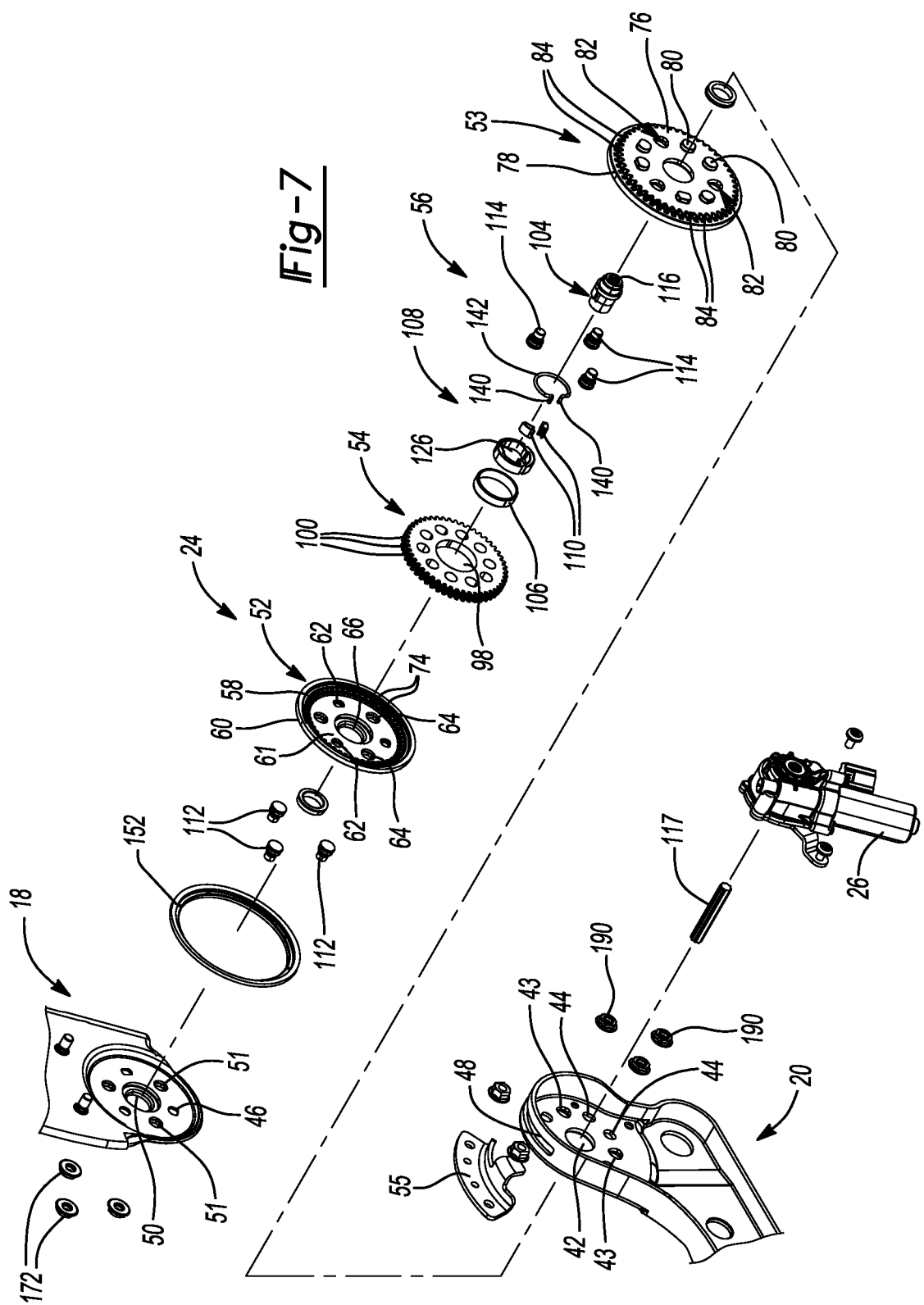
FIG. 7 is another exploded view of the recliner mechanism.

As shown in FIGS. 6 and 7, the seat bottom frame 20 may include a first opening 42 extending therethrough, second openings 43 disposed around the first opening 42 and third openings 44 disposed around the first opening 42. Each second opening 43 may be disposed between two of the third openings 44. In some configurations, the openings 42, 43, 44 may be formed in a first bracket (not shown) that is attached to the seat bottom frame 20.

The seatback frame 18 may define a first opening 50 extending therethrough, a plurality of second openings 51 disposed around the first opening 50 and a plurality of third openings 46 disposed around the first opening 50. The second and third openings 51, 46 may be arranged in an alternating fashion around the first opening 50. In some configurations, the openings 46, 50, 51 may be formed in a second bracket (not shown) that is attached to the seatback frame 18.

A tab 55 may be attached to the seatback frame 18 and may extend through a slot 48 formed in the seat bottom frame 18. The tab 55 contacts the seat bottom frame 18 at a first end of the slot 48 when the seatback 14 is in the rearward recline position to limit further rotation of the seatback 14 in the rearward recliner position and the tab 55 contacts the seat bottom frame 18 at a second end of the slot 48 when the seatback 14 is in the forward dump position to further limit rotation of the seatback 14 in the forward dump position.

Figure 4:
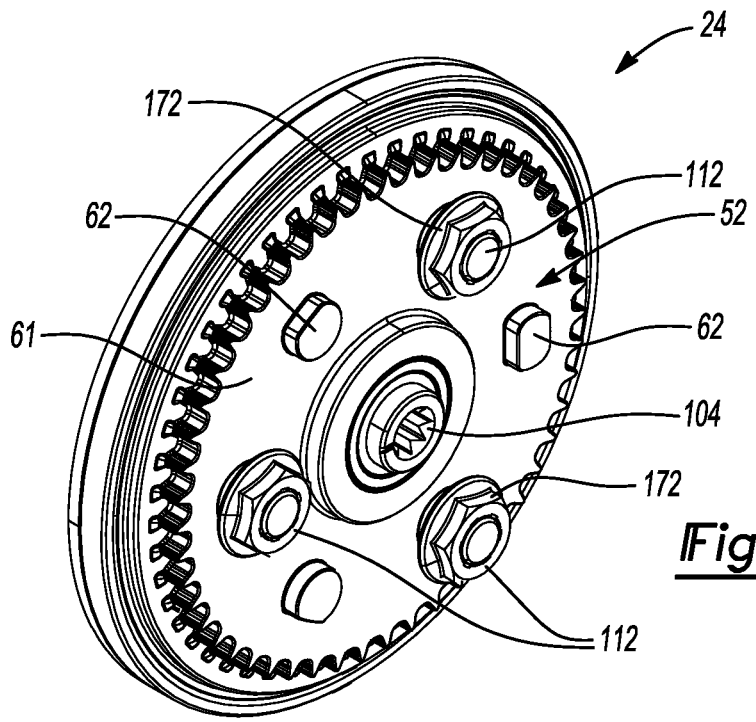
FIG. 4 is a perspective view of a recliner mechanism of the recliner mechanism of FIG. 2.
Figure 5:
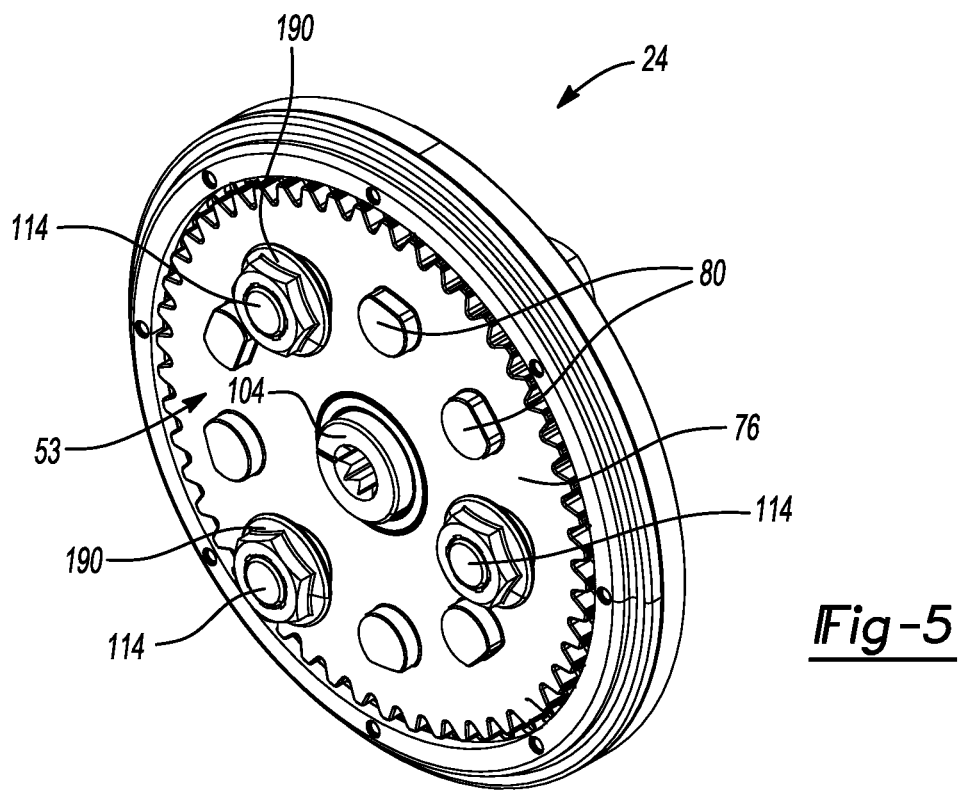
FIG. 5 is another perspective view of the recliner mechanism.

The recliner mechanism 24 may be mounted to the first and second seatback frame 18 and the seat bottom frame 20 and may selectively permit relative rotation between the seatback 14 and the seat bottom 16 among an upright position (FIG. 1), a rearward reclined position (not shown) and a forward dump position (not shown). As shown in FIGS. 4 and 5, the recliner mechanism 24 may be a round recliner mechanism, for example, or any other suitable type of recliner mechanism. As shown in FIGS. 6 and 7, the recliner mechanism 24 may include a first locking plate 52, a second locking plate 53, a third locking plate 54 and a locking assembly 56. In some configurations, the locking plates 52, 53, 54 may be manufactured using the same material specification (e.g., ASTM A506 SAE 4140, CRS steel, with heat treatment as oil quenched and tempered at 54-58 HRC).

Figure 3:
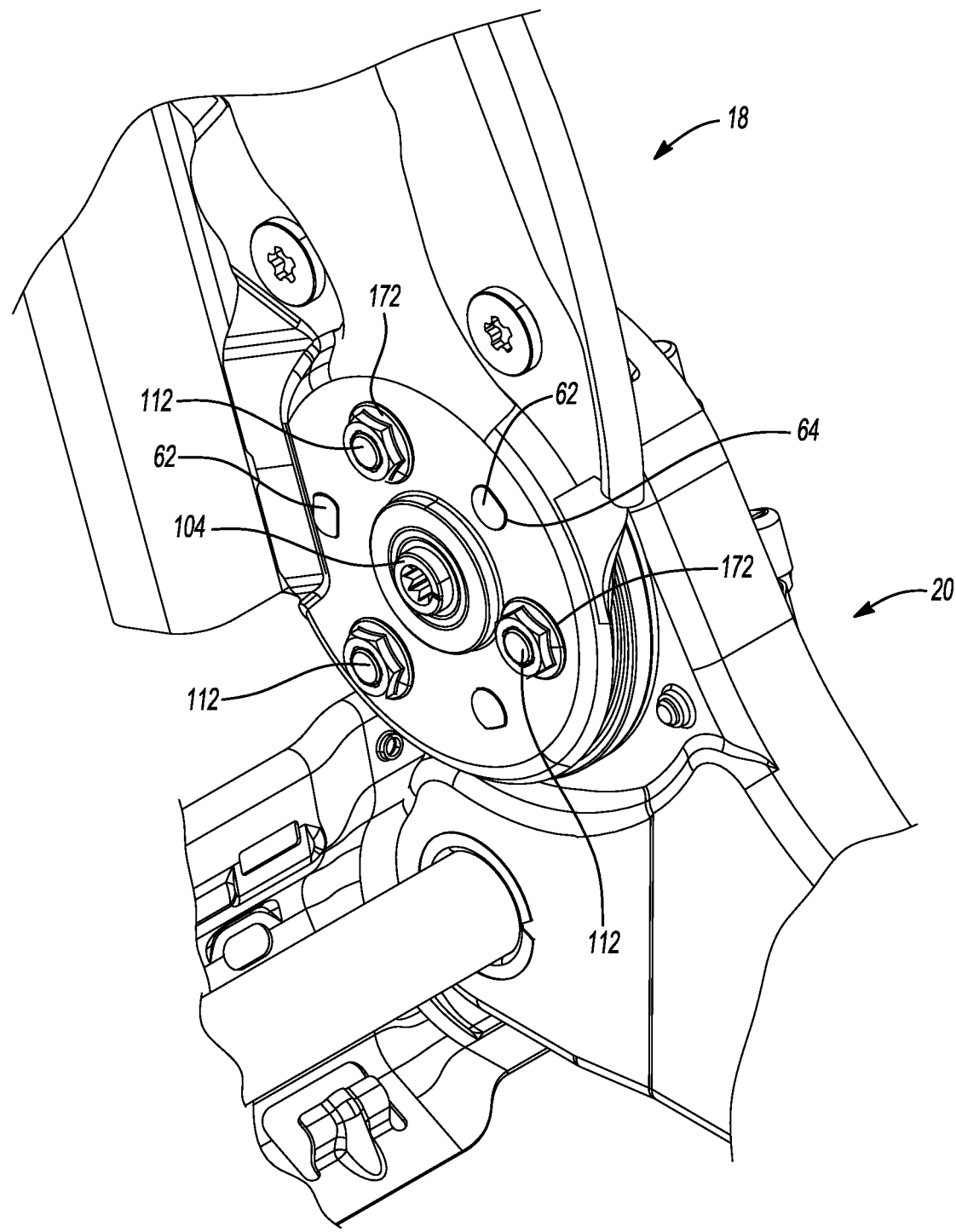
FIG. 3 is another partial perspective view of the seat frame.
Figure 13:
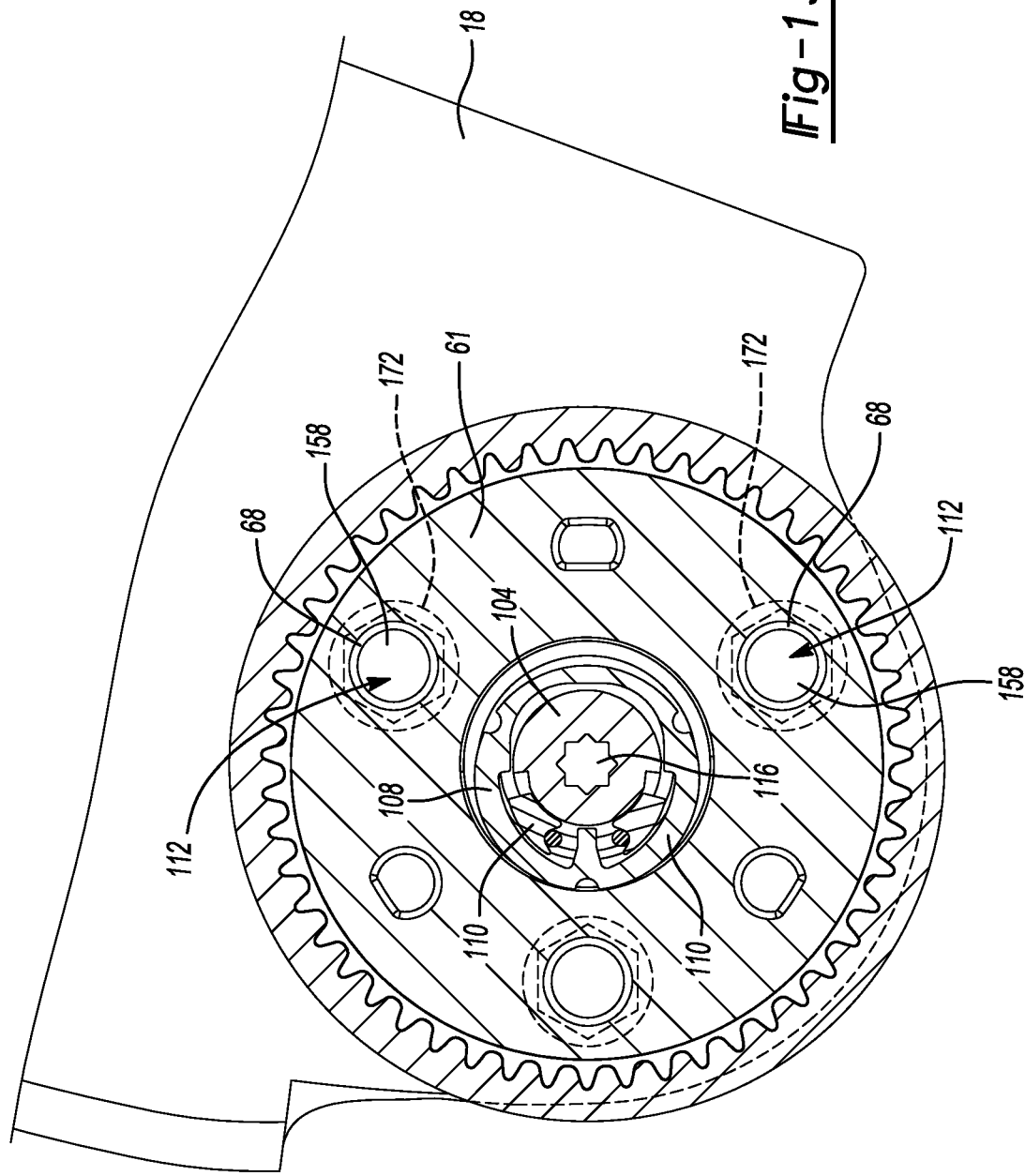
FIG. 13 is a cross-sectional view of the recliner mechanism showing a portion of second fasteners positioned in the second locking plate.
Figure 14:
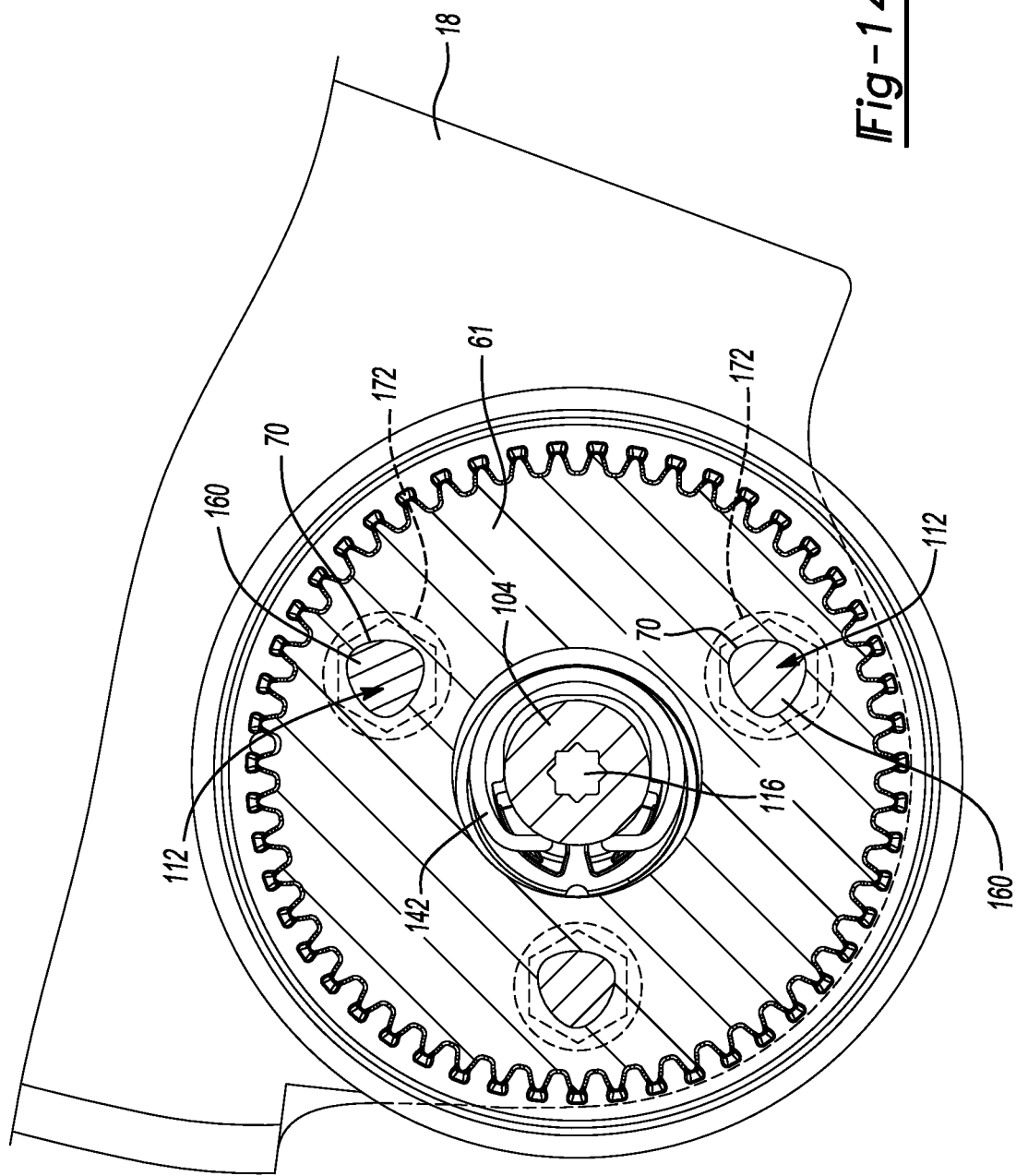
FIG. 14 is a cross-sectional view of the recliner mechanism showing another portion of the second fasteners positioned in the second locking plate.
Figure 15:
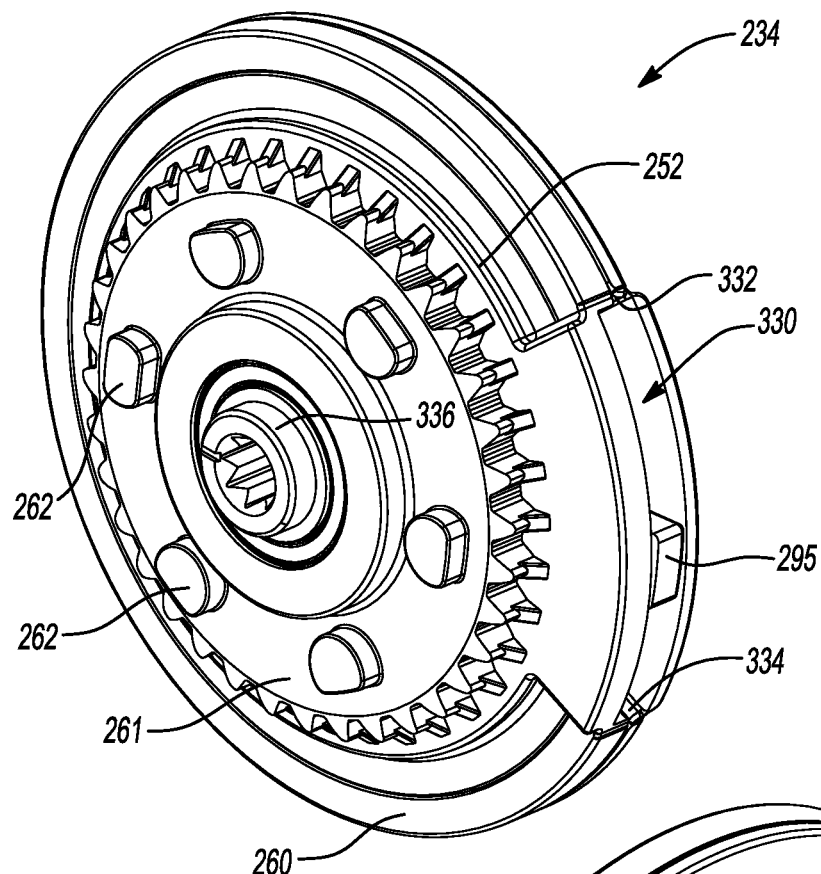
FIG. 15 is a perspective view of an alternate recliner mechanism according to the principles of the present disclosure.
Figure 16:
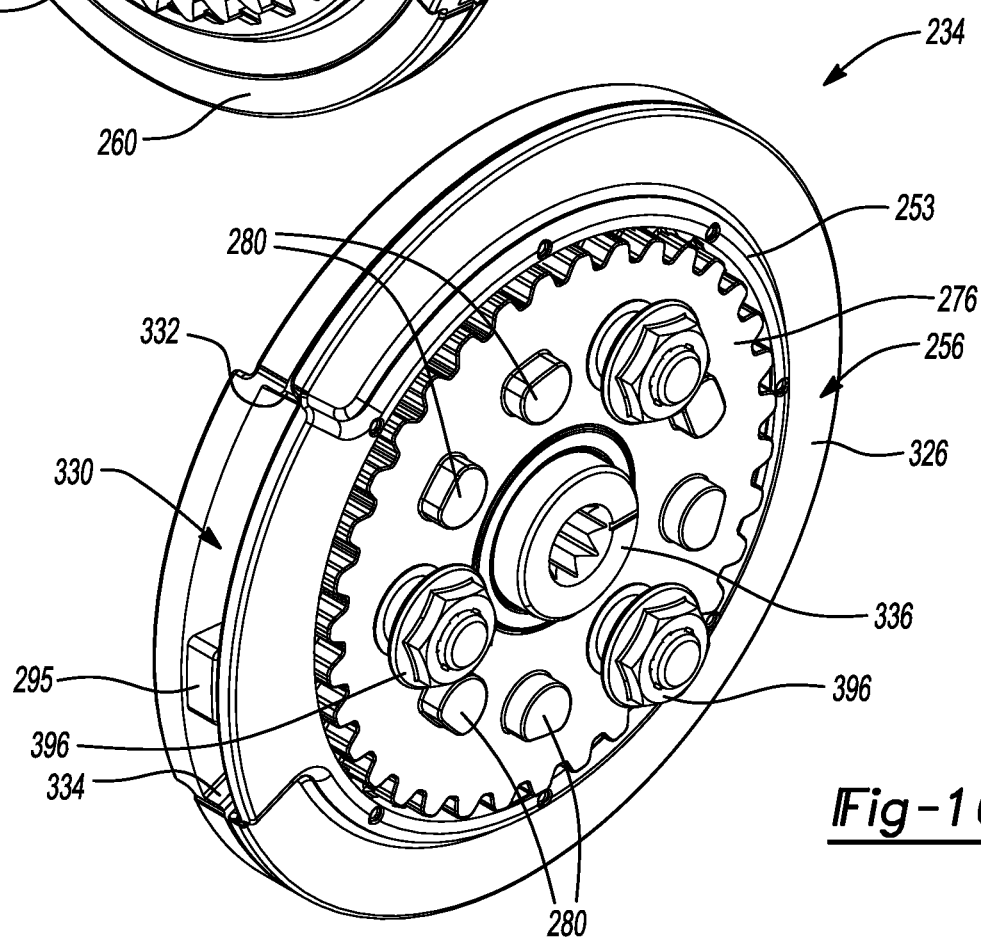
FIG. 16 is another perspective view of the recliner mechanism shown in FIG. 15.

The first locking plate 52 may be rotationally fixed to the seat back frame 18 and may be generally a circular shape. The first locking plate 52 may include an inner section 57, an intermediate section 58 and a rim or outer section 60. The inner section 57 may include a plate body 61 having projections 62 and a plurality of apertures or openings 64. The projections 62 may extend from a surface 65 of the plate body 61 and may be received in respective openings 46 of the seatback frame 18 (FIG. 3), thereby rotationally fixing the first locking plate 52 and the seat back 14. The projections 62 may also be disposed around a stepped opening 66 extending through a center portion of the plate body 61. The plurality of apertures 64 may extend through the plate body 61 and may also be disposed around the stepped opening 66. The plurality of apertures 64 and the projections 62 may be arranged in an alternating fashion. The plurality of apertures 64 may include a first portion 68 (FIG. 13) and a second portion 70 (FIG. 14). The first portion 68 may have a circular-shape and the second portion 70 may have a tri-lobular-shape. Teeth 71 may extend 360 degrees around an outer diametrical surface of the plate body 61.

The intermediate section 58 may include an inner diametrical surface 72 having teeth 74 formed thereon (FIG. 7). The rim 60 may extend 360 degrees around a periphery of the intermediate section 58.

Figure 2:
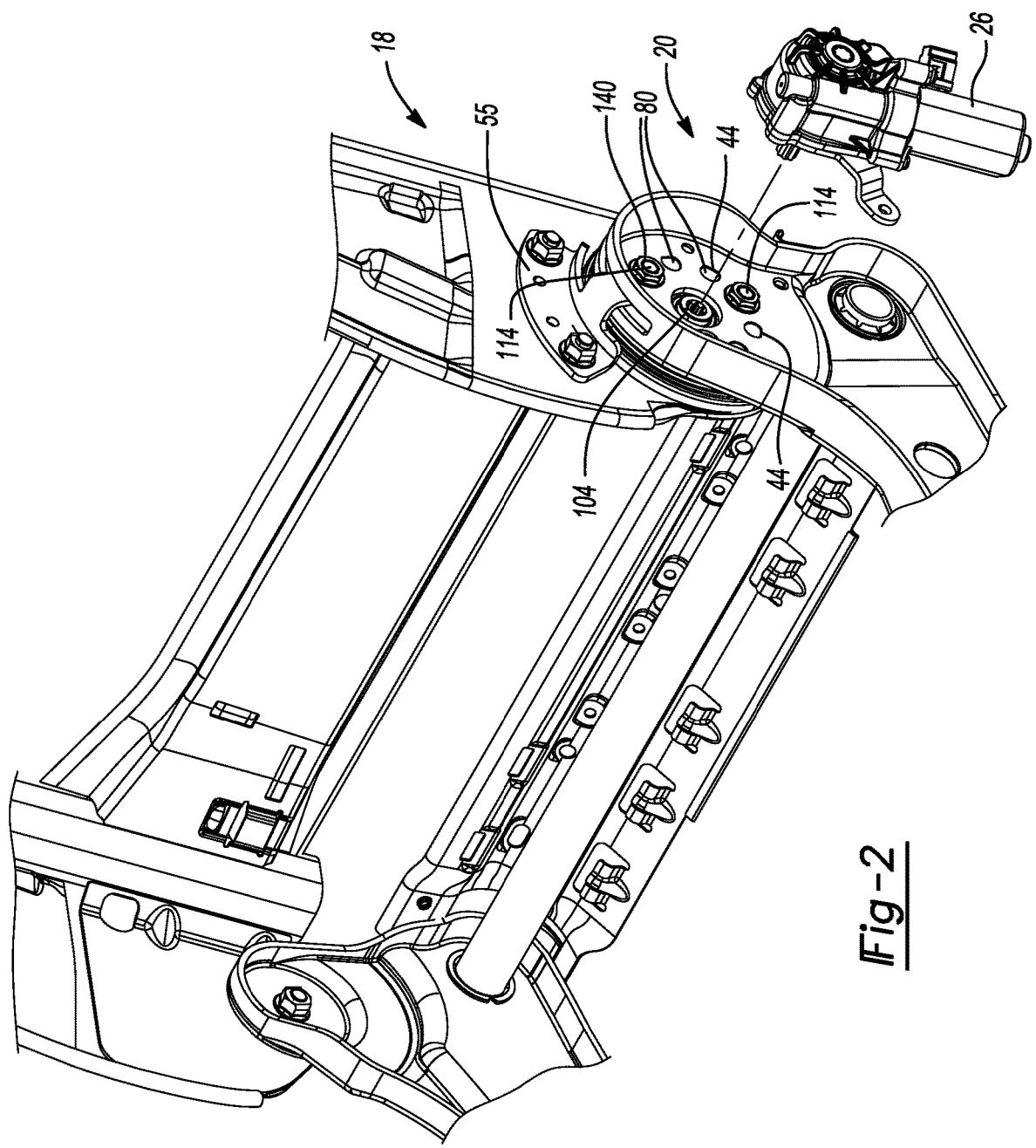
FIG. 2 is a partial perspective view of a seat frame of the seat of FIG. 1.
Figure 11:
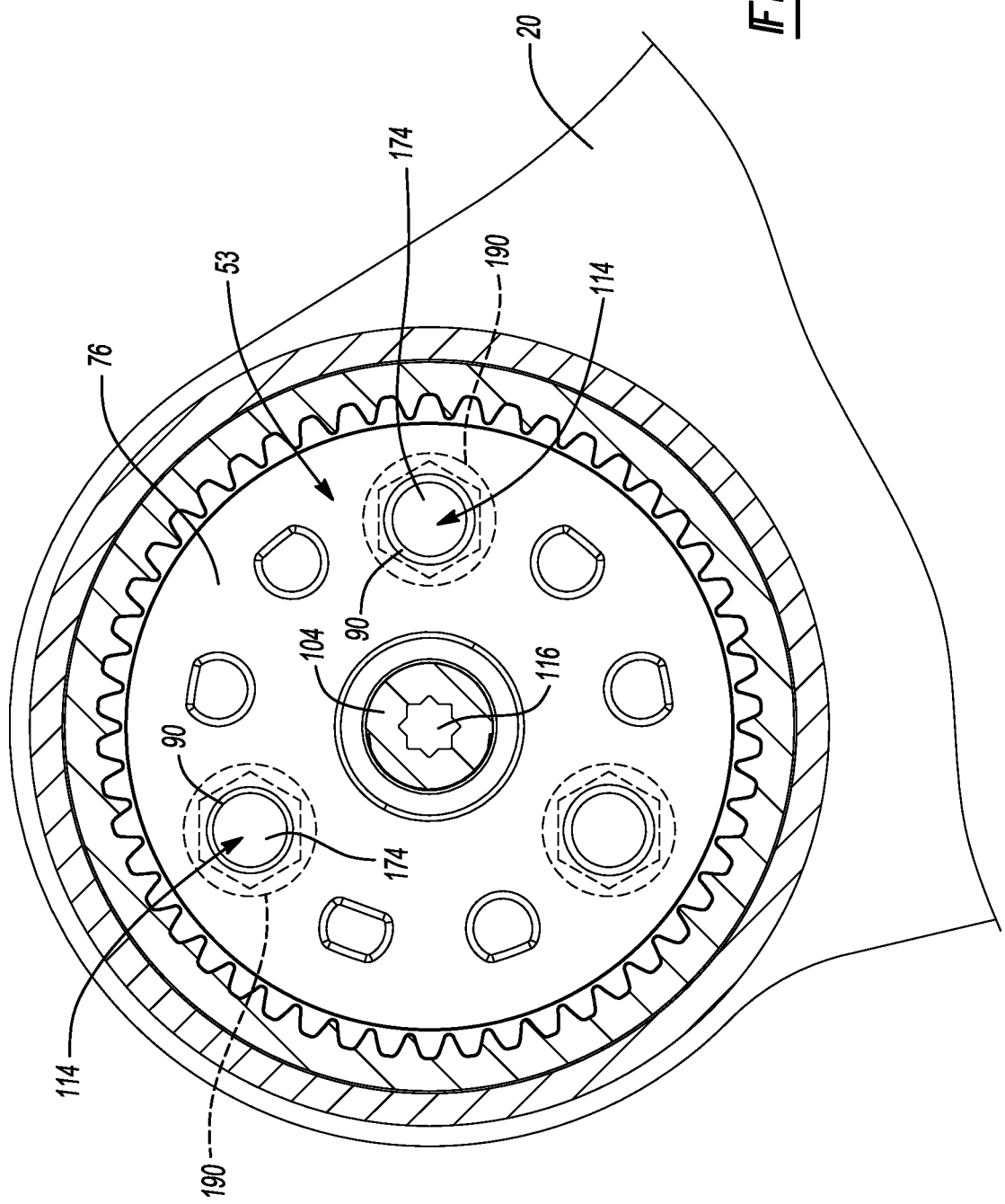
FIG. 11 is a cross-sectional view of the recliner mechanism showing a portion of first fasteners positioned in the first locking plate.
Figure 12:
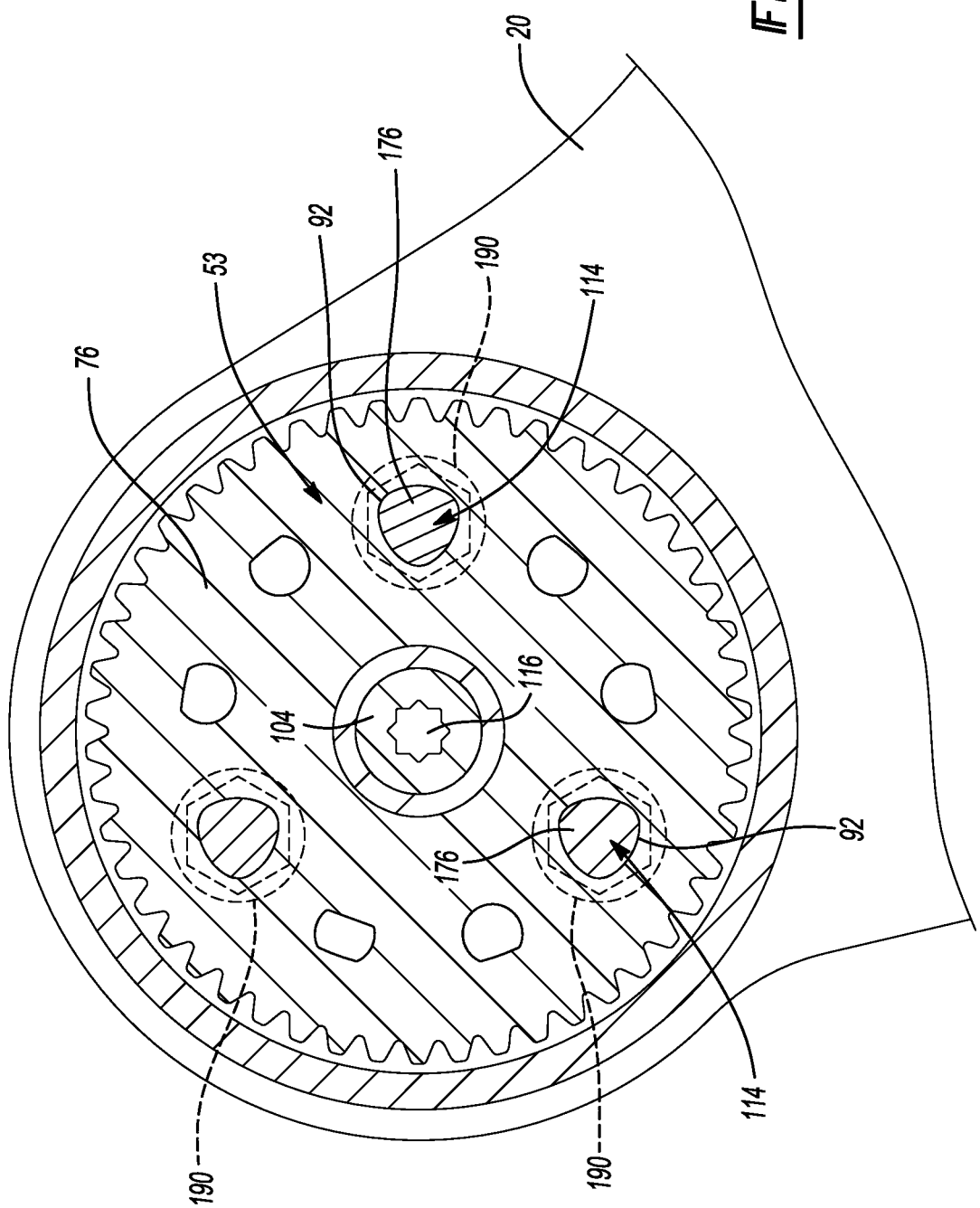
FIG. 12 is a cross-sectional view of the recliner mechanism showing another portion of the first fasteners positioned in the first locking plate.

The second locking plate 53 may be rotationally fixed to the seat bottom frame 20 and may be generally a circular shape. As shown in FIGS. 6 and 7, the second locking plate 53 may include a plate body 76 and a rim 78. The plate body 76 may include projections 80, a plurality of apertures 82 and teeth 84. The projections 80 may extend from a surface of the plate body 76 and may be received in respective openings 44 of the seat bottom frame 20 (FIG. 2), thereby rotationally fixing the second locking plate 53 and the seat bottom 16. The projections 80 may also be disposed around a central opening 88 extending through the plate body 76. The plurality of apertures 82 may extend through the plate body 76 and may also be disposed around the central opening 88. Each aperture 82 may be disposed between two of the projections 80 and may include a first portion 90 (FIG. 11) and a second portion 92 (FIG. 12). The first portion 90 may have a circular-shape and the second portion 92 may have a trilobular-shape.

The teeth 84 may extend 360 degrees around an outer diametrical surface of the plate body 76 (FIG. 7). The rim 78 may extend 360 degrees around a periphery of the plate body 76 and may include teeth 94 that extends 360 degrees around an inner diametrical surface 96 of the rim 78.

The third locking plate 54 may be a circular-shape and may be disposed between the first and second locking plates 52, 53. The third locking plate 54 may include a central opening 98 and teeth 100 extending 360 degrees around an outer diametrical surface 102. At any given time, some of the teeth 100 (i.e., a first subset of the teeth 100) are free from meshing engagement with any of the teeth 74 of the first locking plate 52 and any of the teeth 94 of the second locking plate 53, while some of the teeth 100 (i.e., a second subset of the teeth 100) may be in meshing engagement with some of the teeth 74 of the first locking plate 52 (FIG. 8) and some of the teeth 94 of the second locking plate 53 (FIG. 9). That is, a first portion of each tooth 100 may be in meshing engagement with teeth 74 of the first locking plate 52 and a second portion of each tooth 100 may be in meshing engagement with teeth 94 of the second locking plate 53. In other words, at any given time, any of the teeth 100 that are in meshing engagement with teeth 74 of the first locking plate 52 are also simultaneously in meshing engagement with teeth 94 of the second locking plate 53.

Figure 10:
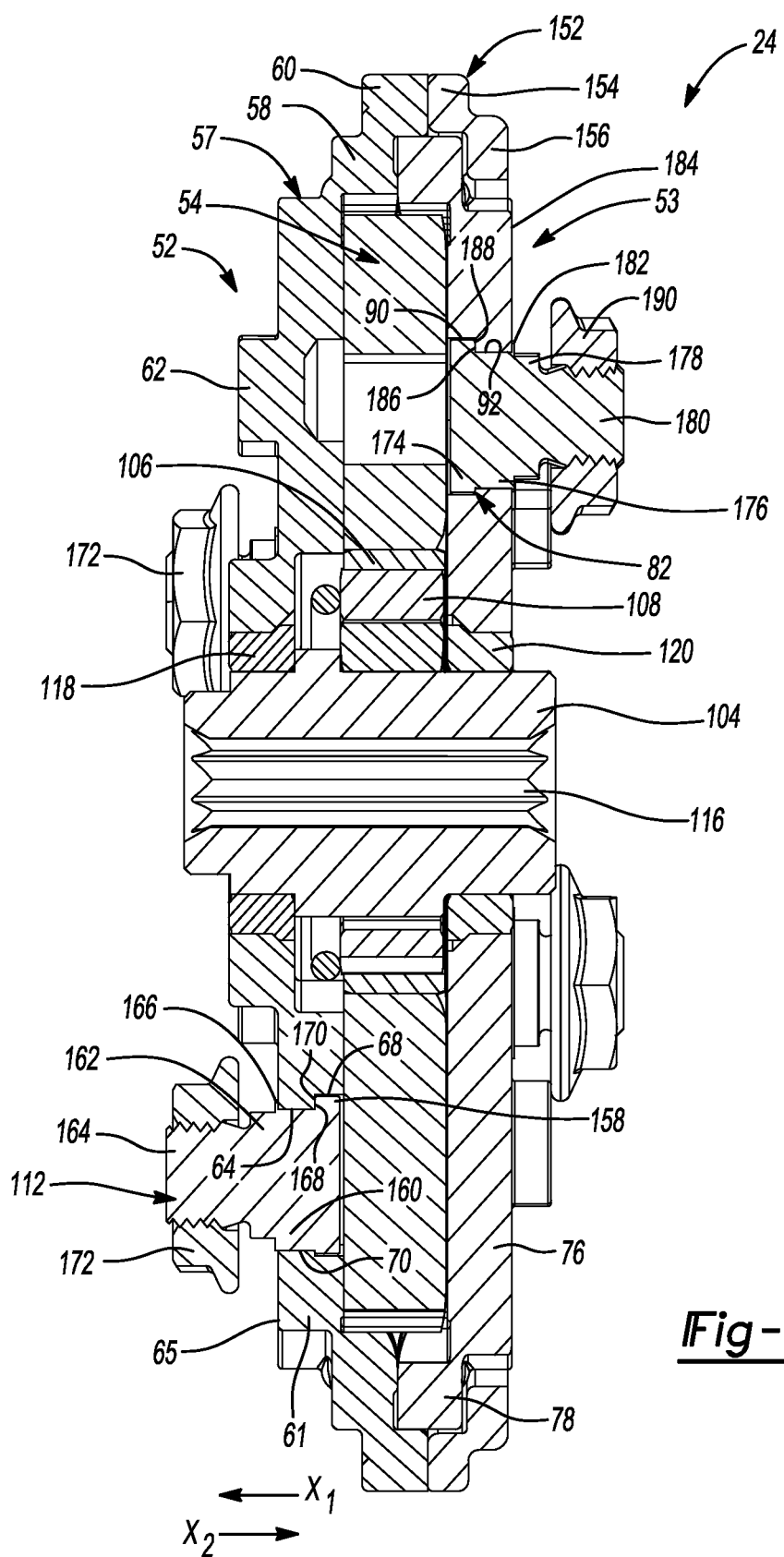
FIG. 10 is another cross-sectional view of the recliner mechanism.

As shown in FIGS. 6 and 7, the locking assembly 56 may include a hub 104, a bushing ring 106, a cam 108, wedges 110, first fasteners 112 and second fasteners 114. The hub 104 may extend through the openings 66, 88, 98 of the first, second and third locking plates 52, 53, 54, respectively, and through the bushing ring 106 and the cam 108. The hub 104 may also define an aperture 116 extending therethrough. A cross member 117 may extend at least partially through the aperture 116 of the hub 104 such that the hub 104 is drivingly engaged thereto. In this way, actuation of an actuation switch 119 (FIG. 1) causes the motor 26 to drive the cross member 117, which causes corresponding rotation of the hub 104. As shown in FIG. 10, a first bushing 118 may be disposed on the hub 104 at or near one end and may be positioned between the hub 104 and the first locking plate 52. A second bushing 120 may be disposed on the hub 104 at or near another end and may be positioned between the hub 104 and the second locking plate 53. The bushing ring 106 may be press-fitted into the opening 98 of the third locking plate 54 and between the third locking plate 54 and the cam 108.

Figure 8:
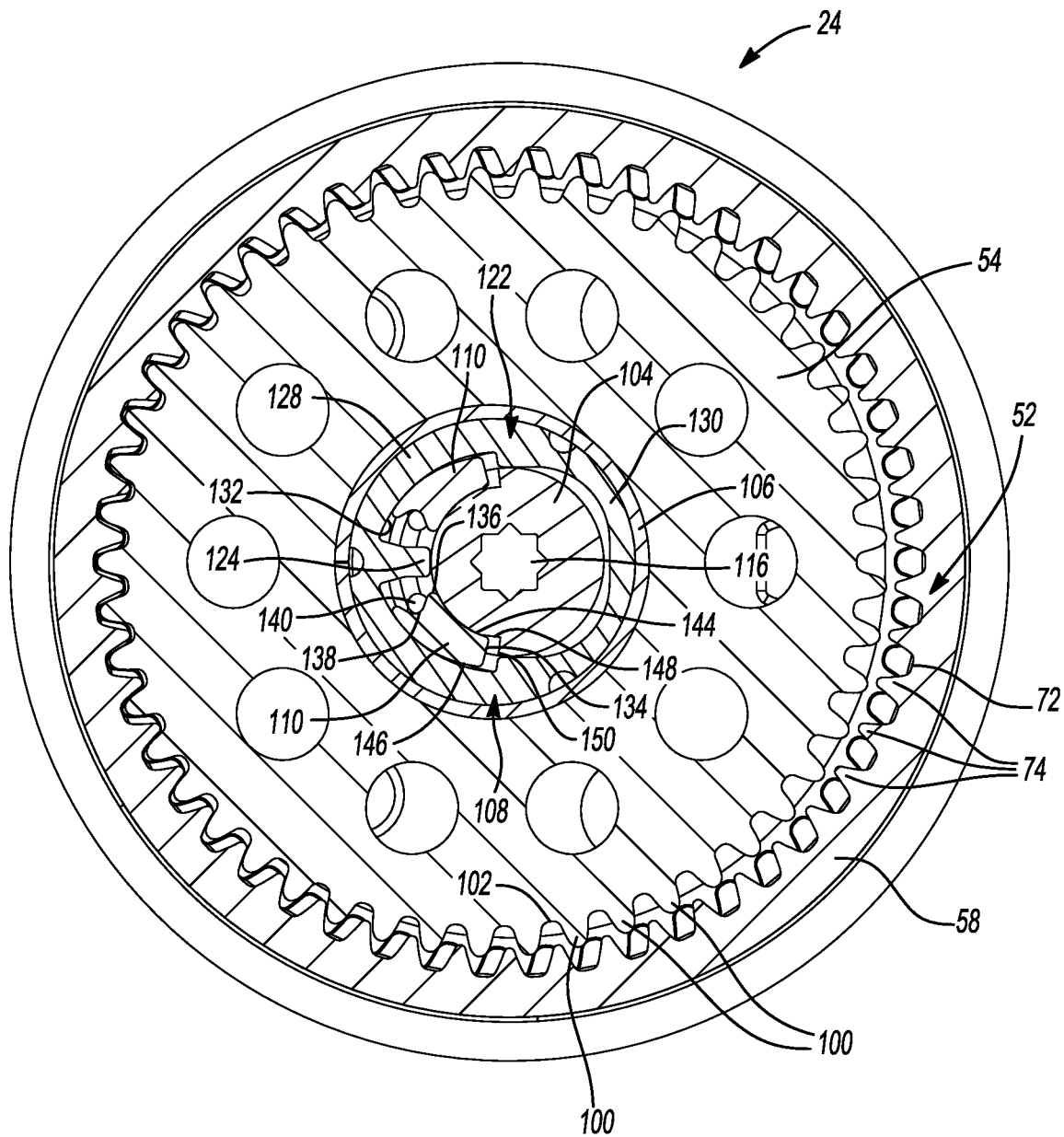
FIG. 8 is a cross-sectional view of the recliner mechanism showing some teeth of a first locking plate of the recliner mechanism in meshing engagement with some teeth of a third locking plate of the recliner mechanism.
Figure 9:
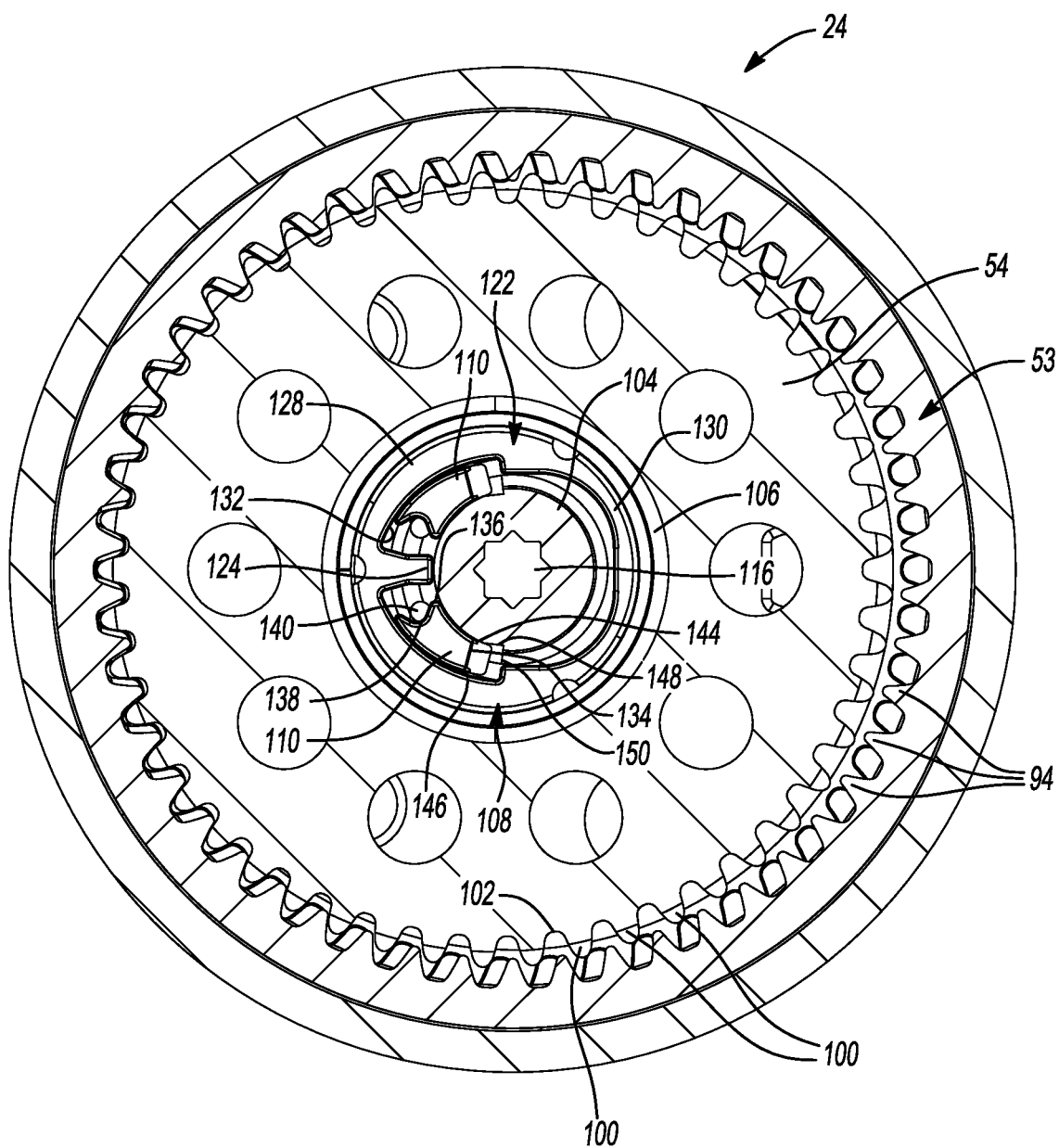
FIG. 9 is a cross-sectional view of the recliner mechanism showing some teeth of a second locking plate of the recliner mechanism in meshing engagement with the some teeth of the third locking plate.

As shown in FIGS. 8 and 9, the cam 108 may be disposed over the hub 104 and may include a body 122 and a protrusion 124. The body 122 may be circular in shape and may define an aperture 126 (FIGS. 6 and 7) that receives the hub 104. The body 122 may have a first portion 128 and a second portion 130. The first portion 128 may have a thickness that is greater than a thickness of the second portion 130. The protrusion 124 may be integral with and extend radially inwardly from an inner surface 132 of the first portion 128.

The wedges 110 are disposed between the hub 104 and the first portion 128 of the body 122. Each wedge 110 has a first end 134 and a second end 136 and increases in thickness from the first end 134 toward the second end 136. The second end 136 defines a groove 138 that receives a respective end 140 of a spring 142 such that the spring 142 forces the wedges 110 outwardly and away from the protrusion 124, thereby reducing chuck (e.g., free play, backlash, etc.) of the recliner mechanism 24. Each wedge 110 also has a curved inner surface 144 and a curved outer surface 146. The inner surface 144 may contact an outer surface 148 of the hub 104 and the outer surface 146 may contact the surface 132 of the first portion 128 of the body 122. The wedges 110 are wedged between the first portion 128 of the body 122 and the hub 104 and rotation of the hub 104 causes rotation of the wedges 110 and the cam 108. In some configurations, one ledge 150 of a pair of ledges 150 of the hub 104 may contact an adjacent wedge 110 (the one ledge 150 may contact the first end 134 of the adjacent wedge 110) as the hub 104 rotates, which, in turn, causes both wedges 110 and the cam 108 to rotate with the hub 104.

As shown in FIG. 10, an encapsulating ring 152 may include a body 154 and a lip 156 that extends radially inwardly from an axial end of the body 154. The body 154 may be attached (e.g., by laser welding) to the first locking plate 52 to hold the recliner mechanism 24 together and also to cover a periphery of the recliner mechanism 24, thereby preventing debris and fluid from infiltrating and damaging the recliner mechanism 24.

Each first fastener 112 may extend through a respective opening 51 of the seatback frame 18 and a respective opening 64 of the first locking plate 52 (FIG. 10), and may include a locking portion 158, an anti-rotational portion 160, an intermediary portion 162 and a threaded portion 164. The locking portion 158 may be circular-shaped and may be received in the first portion 68 of the aperture 64 of the first locking plate 52 (FIG. 13). The anti-rotational portion 160 may be disposed between the locking portion 158 and the intermediary portion 162 (FIG. 10) and may be trilobular-shaped. The anti-rotational portion 160 may be received in the second portion 70 of the aperture 64 of the first locking plate 52 (FIG. 14), thereby preventing rotation of the first fastener 112 within the aperture 64. The trilobular shape of the anti-rotational portion 160 also increases the strength of the recliner mechanism 24. That is, the trilobular shape of the anti-rotational portion 160 increases the torque required to deform the recliner mechanism 24 (e.g., during an impact event).

The intermediary portion 162 is disposed between the anti-rotational portion 160 and the threaded portion 164 and is positioned outside of the aperture 64 (FIG. 10). The intermediary portion 162 may be circular-shaped and may have a diameter that is smaller than a diameter of the locking portion 158. An outer diametrical surface of the intermediary portion 162 may be deformed once the first fastener 112 extends through the first locking plate 52 to create an annular-shaped collar or flange 166 that abuts against the surface 65 of the plate body 61 (FIG. 10). In this way, the flange 166 and the locking portion 158 cooperate to restrict axial movement of the first fastener 112. That is, an annular surface 168 of the locking portion 158 contacts an annular surface 170 of the aperture 64 to restrict movement of the first fastener 112 in a first axial direction X1, and the flange 166 contacts the surface 65 of the plate body 61 to restrict movement of the first fastener 112 in a second axial direction X2 that is opposite of the first axial direction X1. The threaded portion 164 may extend through the respective opening 51 of the of the seatback frame 18. A nut 172 may be threadably engaged to the threaded portion 164, thereby further securing the first locking plate 52 to the seatback 14.

Each second fastener 114 may extend through a respective opening 43 of the seat bottom frame 20 and a respective aperture 82 of the second locking plate 53 (FIG. 10), and may include a locking portion 174, an anti-rotational portion 176, an intermediary portion 178 and a threaded portion 180. The locking portion 174 may be circular-shaped and may be received in the first portion 90 of the aperture 82 of the second locking plate 53 (FIG. 11). The anti-rotational portion 176 may be disposed between the locking portion 174 and the intermediary portion 178 (FIG. 10) and may be trilobular-shaped. The anti-rotational portion 176 may be received in the second portion 92 of the aperture 82 of the second locking plate 53 (FIG. 12), thereby preventing rotation of the second fastener 114 within the aperture 82. The trilobular shape of the anti-rotational portion 176 also increases the strength of the recliner mechanism 24. That is, the trilobular shape of the anti-rotational portion 176 increases the torque required to deform the recliner mechanism 24.

The intermediary portion 178 is disposed between the anti-rotational portion 176 and the threaded portion 180 and is positioned outside of the aperture 82 (FIG. 10). The intermediary portion 178 may be circular-shaped and may have a diameter that is smaller than a diameter of the locking portion 174. An outer diametrical surface of the intermediary portion 178 may be deformed once the second fastener 114 extends through the second locking plate 53 to create an annular-shaped collar or flange 182 that abuts against a surface 184 of the plate body 76 (FIG. 10). In this way, the flange 182 and the locking portion 174 cooperate to restrict axial movement of the second fastener 114. That is, an annular surface 186 of the locking portion 174 contacts an annular surface 188 of the aperture 82 to restrict movement of the second fastener 114 in the second axial direction X2, and the flange 182 contacts the surface 184 of the plate body 76 to restrict movement of the second fastener 114 in the first axial direction X1. The threaded portion 180 may extend through the respective opening 43 of the seat bottom frame 20. A nut 190 may be engaged to the threaded portion 180, thereby further securing the second locking plate 53 to the seat bottom 16.

The structure of the first and second fasteners 112, 114 provides the benefit of increasing the strength of the recliner mechanism 24, thereby reducing or preventing movement of the seatback 14 relative to the seat bottom 16 when the recliner mechanism 24 is in the locked position. Stated another way, the recliner mechanism 24 may be have a high torque load capacity (e.g., loads ≥4000 Nm) It should be understood that although the present disclosure provides the recliner mechanism 24 having first and second fasteners 112, 114, the benefit of increased strength of the recliner mechanism 24 may be obtained with having either the first fasteners 112 or the second fasteners 114. In other words, the present disclosure may provide the recliner mechanism 24 with either the first fasteners 112 or the second fasteners 114 in order to obtain the benefit of increased strength of the recliner mechanism 24.

It should also be understood that the recliner mechanism 24 of the present disclosure can be used in a double sided recliner assembly (i.e., a recliner assembly having recliner mechanisms operatively coupled to opposing sides of the seatback 14 and that are movable between locked and unlocked states by rotation of a cross bar extending between and engaged with the recliner mechanisms). It should also be understood that the recliner mechanism 24 of the present disclosure also provides for anti-back drive capability. That is, the recliner mechanism 24 prevents rotation of the locking plates 52, 53, 54 and the locking assembly 56 when in the lock position and the seatback 14 carries a load.

With reference to FIGS. 15-23, another recliner mechanism 234 is provided. The structure and function of the recliner mechanism 234 may be similar or identical to the recliner mechanism 24 described above, apart from any exception noted below.

Figure 17:
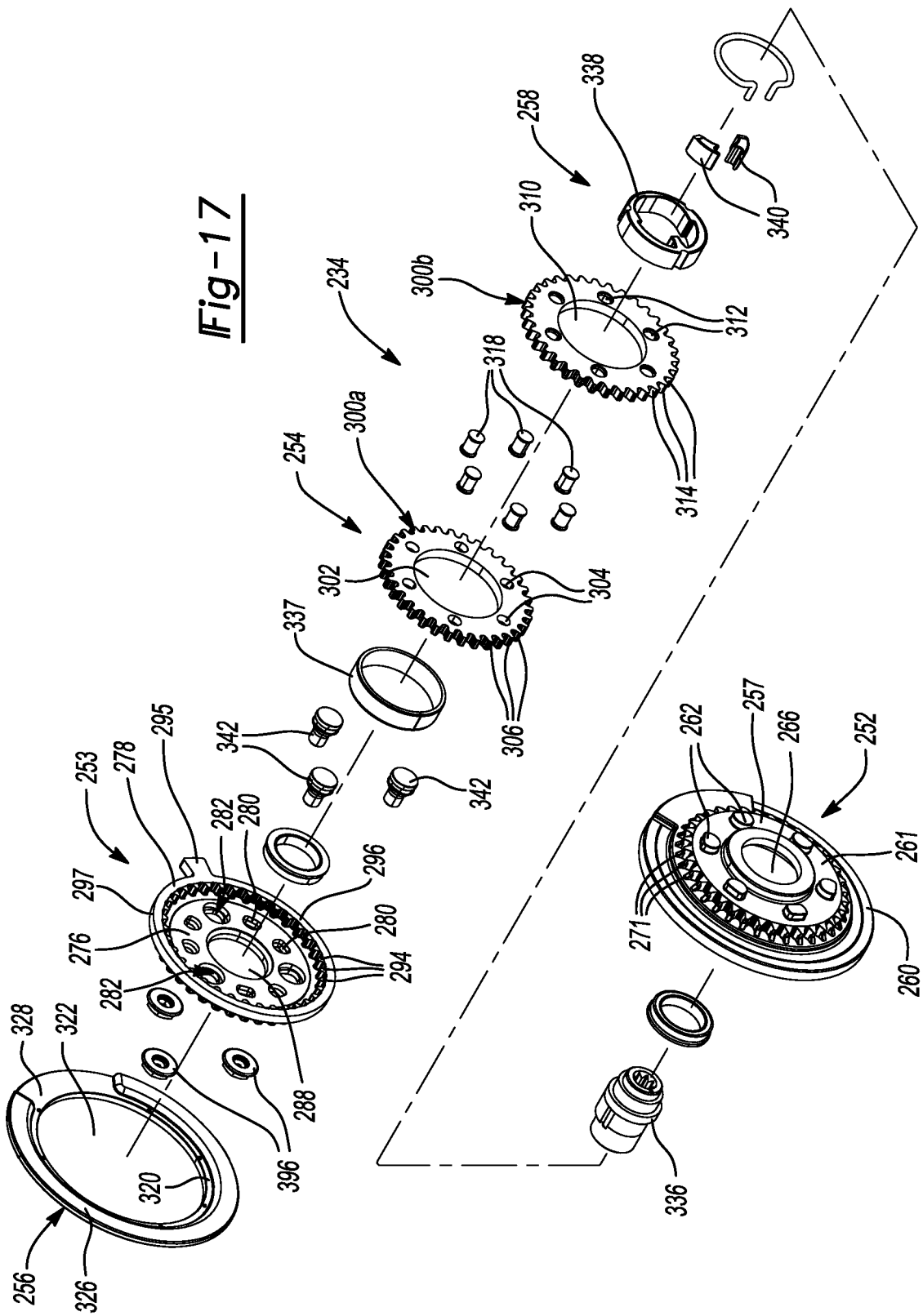
FIG. 17 is an exploded view of the recliner mechanism shown in FIG. 15.
Figure 18:
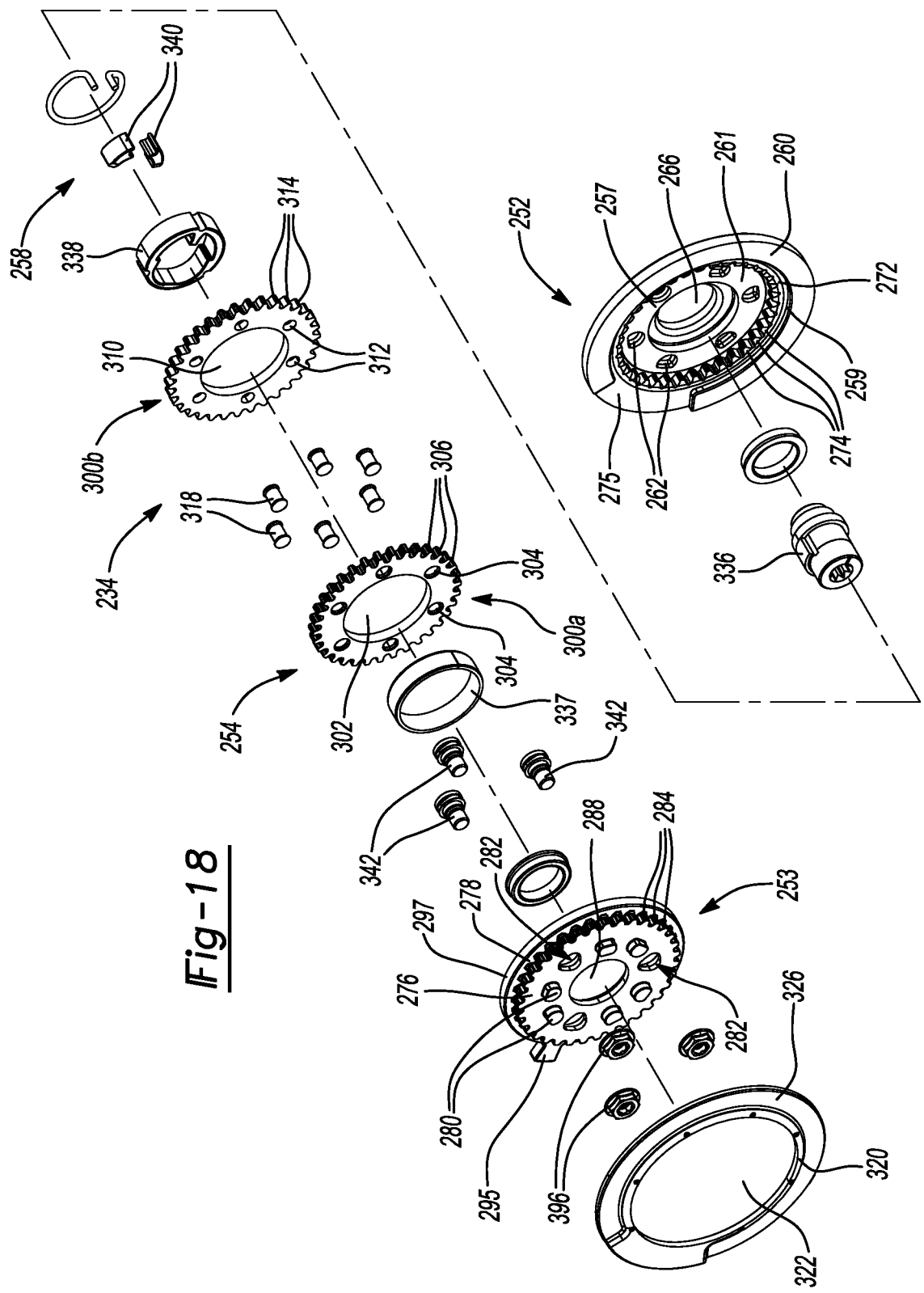
FIG. 18 is another exploded view of the recliner mechanism shown in FIG. 15.

The recliner mechanism 234 may be mounted to the seatback frame (not shown) and the seat bottom frame (not shown) and may selectively permit relative rotation between the seatback and the seat bottom. As shown in FIGS. 17 and 18, the recliner mechanism 234 may include a first locking plate 252, a second locking plate 253, a locking ring assembly 254, an encapsulating ring 256 and a locking assembly 258.

The first locking plate 252 may be rotationally fixed to the seatback frame and may be generally a circular shape. The first locking plate 252 may include an inner section 257, an intermediate section 259 and a rim or outer section 260. The inner section 257 may include a plate body 261 having projections 262 extending from a surface thereof. The projections 262 may be received in respective openings (not shown) of the seatback frame, thereby rotationally fixing the first locking plate 252 and the seatback. The projections 262 may also be disposed around a stepped opening 266 extending through a center portion of the plate body 261. Teeth 271 may extend 360 degrees around an outer diametrical surface of the plate body 261.

As shown in FIG. 18, the intermediate section 259 may include an inner diametrical surface 272 having teeth 274 formed thereon. The rim 260 may extend at least partially around a periphery of the intermediate section 259 and may define a recess 275.

The second locking plate 253 may be rotationally fixed to the seat bottom frame 220 and may be generally a circular shape. As shown in FIGS. 17 and 18, the second locking plate 253 may include a plate body 276 and a rim 278. The plate body 276 may include projections 280, a plurality of apertures or openings 282 and teeth 284. The projections 280 may extend from a surface of the plate body 276 and may be received in respective openings of the seat bottom frame 220, thereby rotationally fixing the second locking plate 253 and the seat bottom (not shown). The projections 280 may also be disposed around a central opening 288 extending through a center of the plate body 276. The plurality of apertures 282 may extend through the plate body 276 and may also be disposed around the central opening 288. Each aperture 282 may be disposed between two of the projections 280 and may include a first portion 290 and a second portion 292. The first portion 290 may have a circular-shape and the second portion 292 may have a trilobular-shape.

The teeth 284 may extend 360 degrees around an outer diametrical surface of the plate body 276. The rim 278 may extend 360 degrees around a periphery of the plate body 276 and may include teeth 294 that extends 360 degrees around an inner diametrical surface 296 of the rim 278 (FIG. 17). A generally rectangular-shaped protrusion 295 may extend radially outwardly from an outer diametrical surface 297 of the rim 278.

Figure 19:
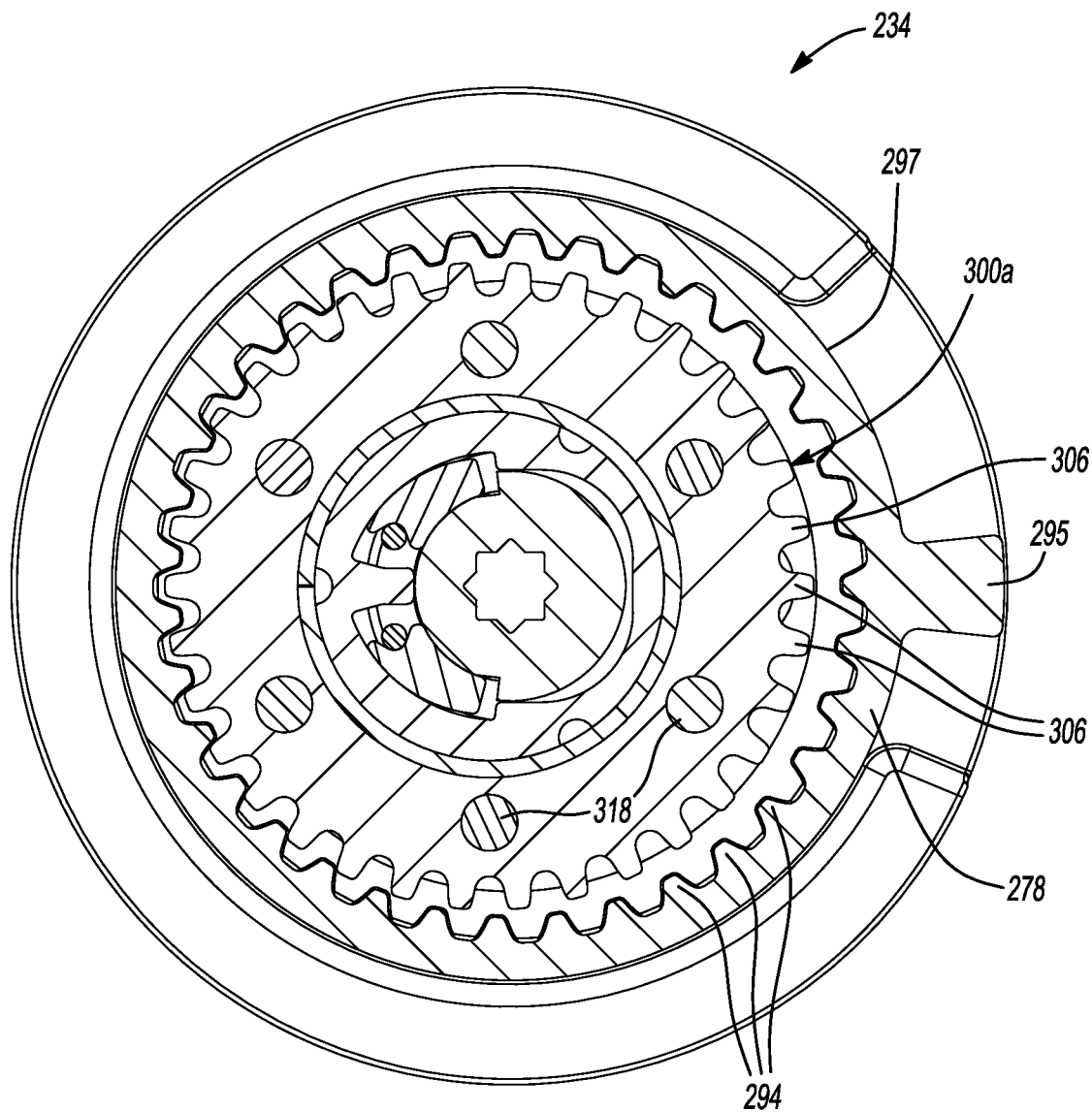
FIG. 19 is a cross-sectional view of the recliner mechanism of FIG. 15 showing some teeth of a first locking plate of the recliner mechanism in meshing engagement with some teeth of a first locking ring of the recliner mechanism.

As shown in FIGS. 17 and 18, the locking ring assembly 254 may be disposed between the first and second locking plates 252, 253. The locking ring assembly 254 may include a first locking ring 300a and a second locking ring 300b. The first locking ring 300a may include a central opening 302, apertures 304 disposed around the central opening 302 and teeth 306 extending 360 degrees around an outer diametrical surface. Some of the teeth 306 may be in meshing engagement with some of the teeth 294 of the second locking plate 253 (FIG. 19).

Figure 20:
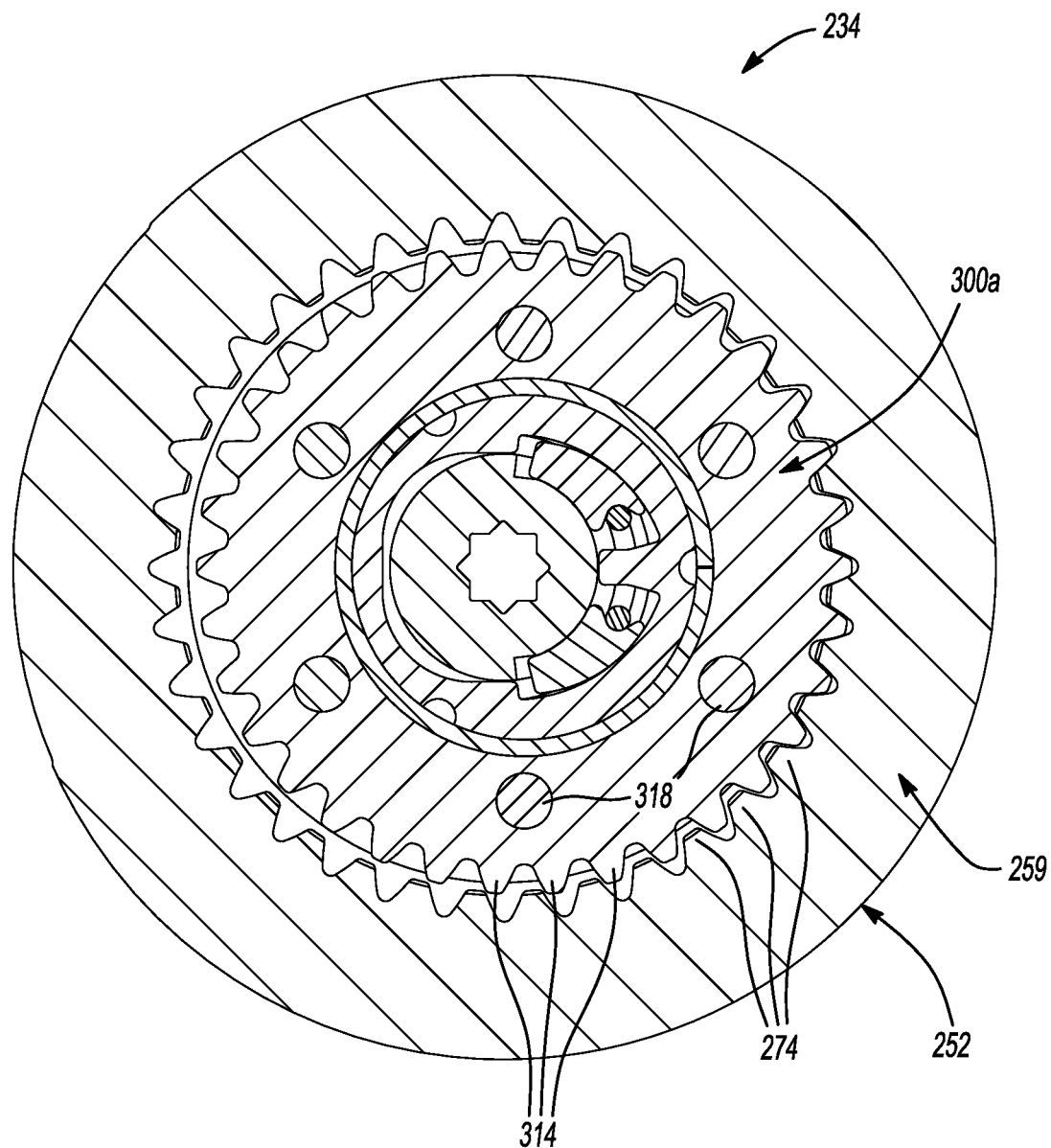
FIG. 20 is a cross-sectional view of the recliner mechanism of FIG. 15 showing some teeth of a second locking plate of the recliner mechanism in meshing engagement with some teeth of a second locking ring of the recliner mechanism.

The second locking ring 300b may include a central opening 310, apertures 312 disposed around the central opening 310 and teeth 314 extending 360 degrees around an outer diametrical surface. The apertures 312 may be aligned with respective apertures 304 of the first locking ring 300a. In this way, fasteners 318 (e.g., rivets, bolts, etc.) may extend through the apertures 304, 312 of the first and second locking rings 300a, 300b, respectively, thereby rotationally coupling the first and second locking rings 300a, 300b to each other. Some of the teeth 314 may be in meshing engagement with some of the teeth 274 of the first locking plate 252 (FIG. 20). In some configurations, the locking plates 252, 253 and locking rings 300a, 300b may be manufactured using the same material specification (e.g., ASTM A506 SAE 4140, CRS steel, with heat treatment as oil quenched and tempered at 54-58 HRC).

Figure 21:
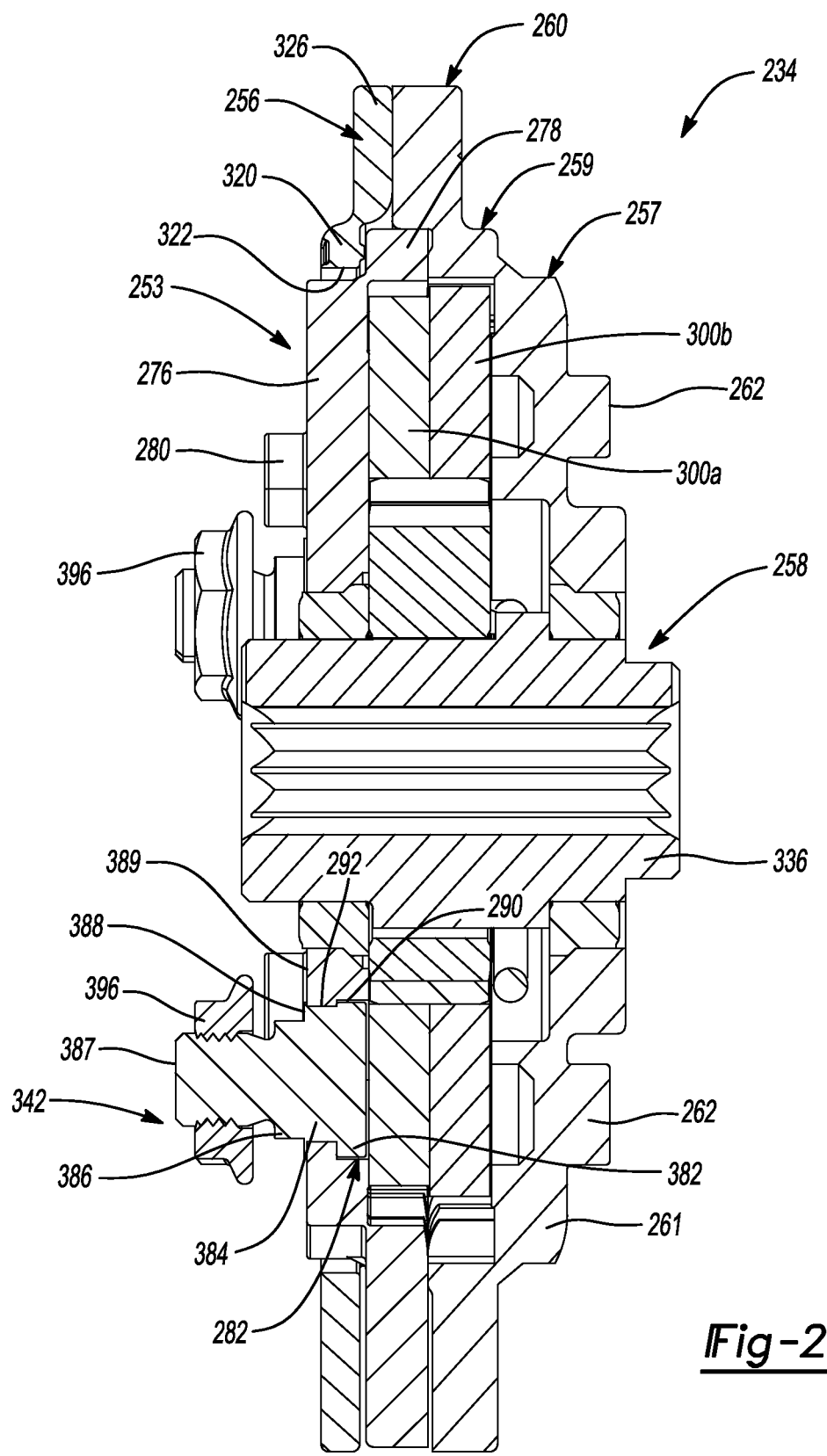
FIG. 21 is another cross-sectional view of the recliner mechanism of FIG. 15.
Figure 22:
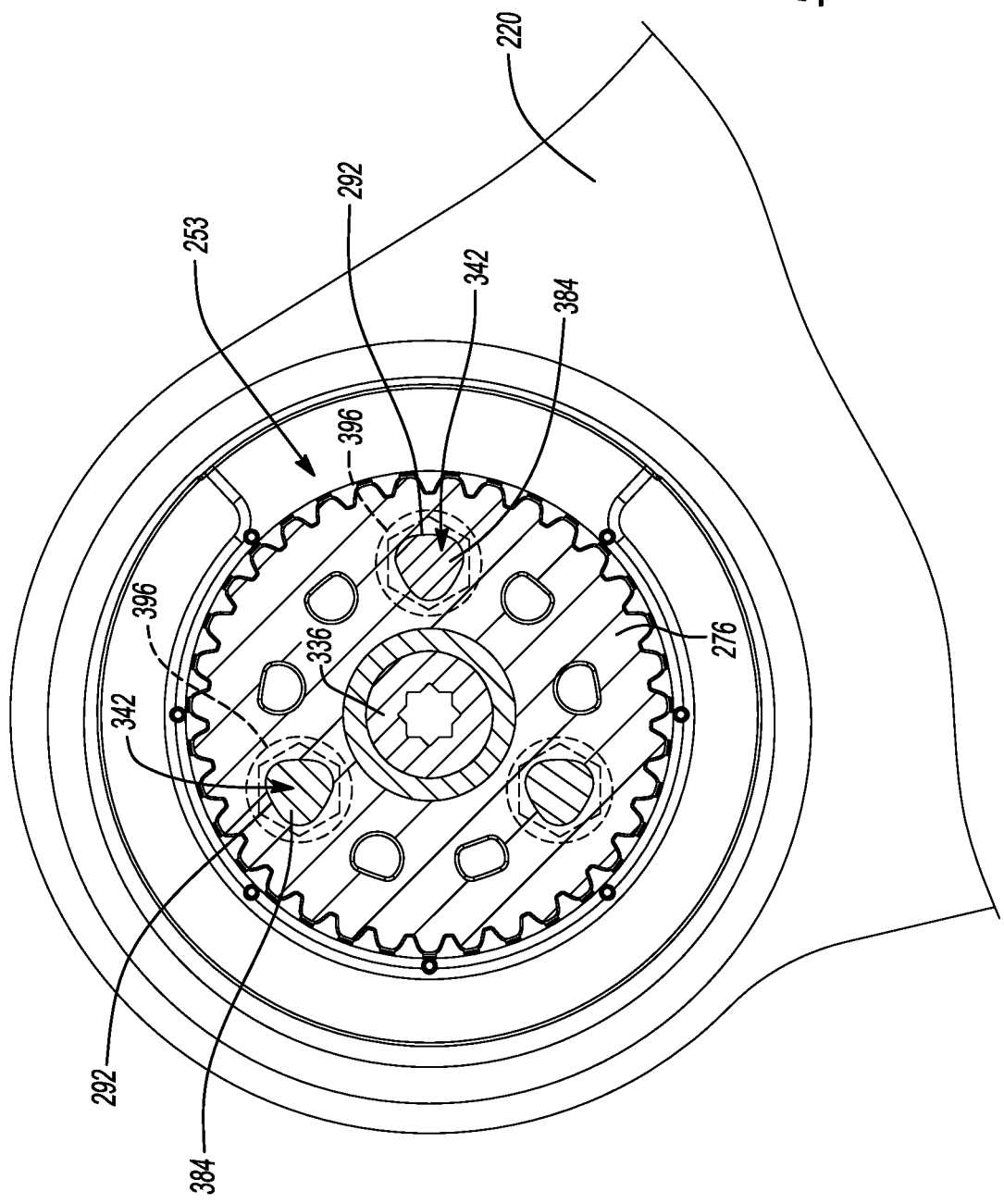
FIG. 22 is a cross-sectional view of the recliner mechanism showing a portion of fasteners positioned in the second locking plate.

As shown in FIG. 21, the encapsulating ring 256 may be attached (e.g., by laser welding) to the first locking plate 252 to hold the recliner mechanism 234 together and also to cover a periphery of second locking plate 253, thereby preventing debris and fluid from infiltrating and damaging internal components of the recliner mechanism 234. The encapsulating ring 256 may include a body 320 defining an opening 322 and a rim 326. The rim 326 may extend radially outwardly from a periphery of the body 320 and may define a recess 328 (FIG. 17). The recess 328 may cooperate with the recess 275 of the first locking plate 252 to form a curved slot 330 (FIGS. 15 and 16) that receives the protrusion 295. The protrusion 295 may traverse the slot 330. That is, the protrusion 295 contacts a first end wall 332 of the slot 330 when the seatback is in the rearward recline position to limit further rotation of the seatback in the rearward recline position, and contacts a second end wall 334 of the slot 330 when the seatback is in the forward dump position to further limit rotation of the seatback in the forward dump position. In this way, the seatback frame or the seat bottom frame 220 do not have to include a separate stop mechanism to limit rotation of the seatback in the forward dump position and rearward recline position.

As shown in FIGS. 17 and 18, the locking assembly 258 may include a hub 336, a bushing ring 337, a cam 338, wedges 340 and fasteners 342. The structure and function of the hub 336, the bushing ring 337, the cam 338, the wedges 340 and the fasteners 342 may be similar or identical to the hub 104, the bushing ring 106, the cam 108, wedges 110 and the fasteners 114, respectively, described above, and therefore, will not be described again in detail.

Figure 23:
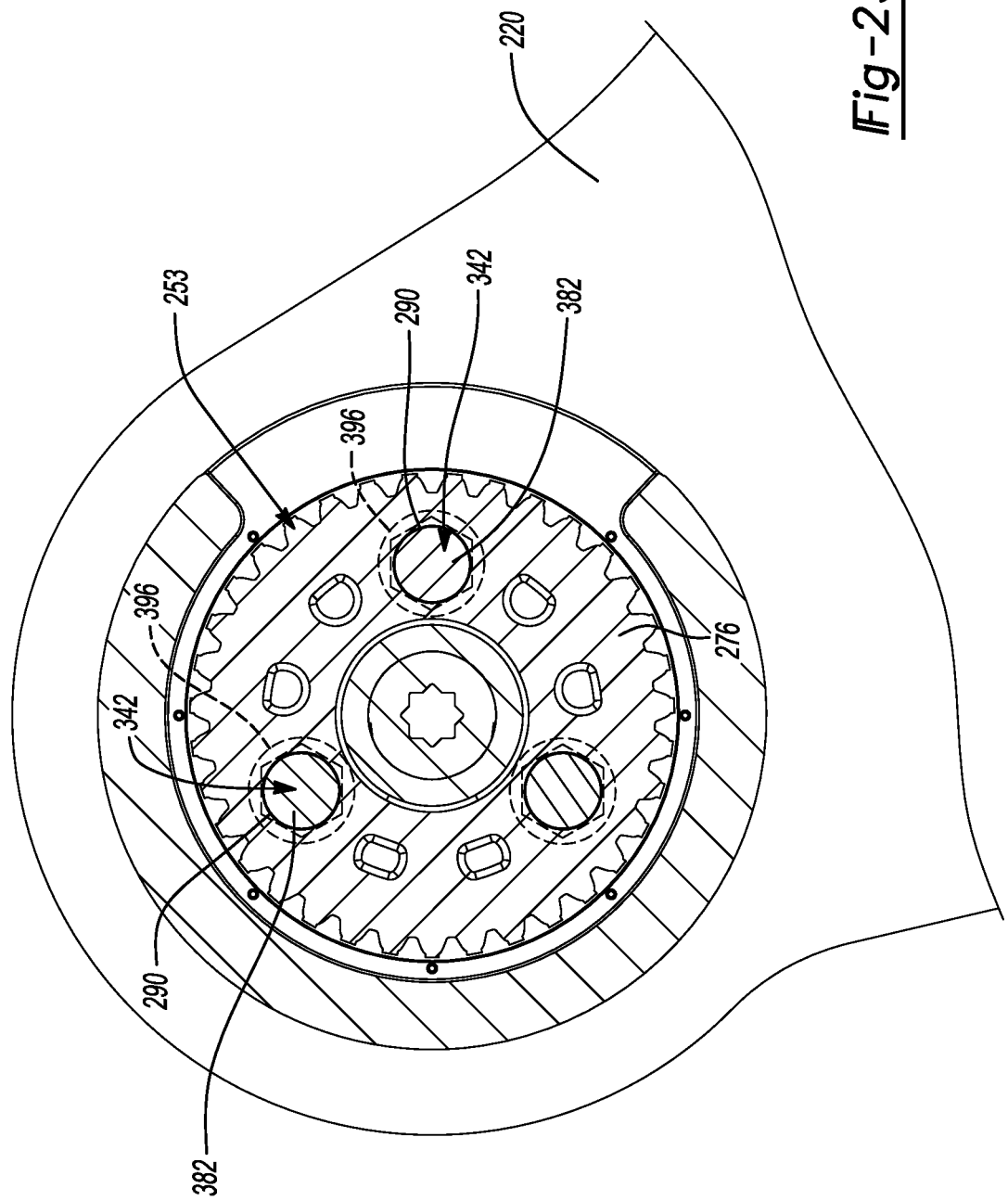
FIG. 23 is a cross-sectional view of the recliner mechanism showing another portion of the fasteners positioned in the second locking plate.

Each fastener 342 may extend through a respective opening of the seat bottom frame 220 and a respective opening 282 of the second locking plate 253 (FIG. 21), and may include a locking portion 382, an anti-rotational portion 384, an intermediary portion 386 and a threaded portion 387. The locking portion 382 may be circular-shaped and may be received in the first portion 290 of the aperture 282 of the second locking plate 253 (FIG. 23). The anti-rotational portion 384 may be disposed between the locking portion 382 and the intermediary portion 386 and may be trilobular-shaped. The anti-rotational portion 384 may be received in the second portion 292 of the aperture 282 of the second locking plate 253 (FIG. 22), thereby preventing rotation of the fastener 342 within the aperture 282.

The intermediary portion 386 is disposed between the anti-rotational portion 384 and the threaded portion 387 and is positioned outside of the aperture 282 (FIG. 21). The intermediary portion 386 may be circular-shaped and may have a diameter that is smaller than a diameter of the locking portion 382. An outer diametrical surface of the intermediary portion 386 may be deformed once the fastener 342 extends through the second locking plate 253 to create an annular-shaped collar or flange 388 that abuts against a surface 389 of the plate body 276. In this way, the flange 388 and the locking portion 382 cooperate to restrict axial movement of the fastener 342. A nut 396 may be threadably engaged with the threaded portion 387, thereby further securing the second locking plate 253 to the seat bottom.

With reference to FIGS. 24-36, another recliner mechanism 434 is provided. The structure and function of the recliner mechanism 434 may be similar or identical to the recliner mechanism 24, 234 described above, apart from any exception noted below.

Figure 24:
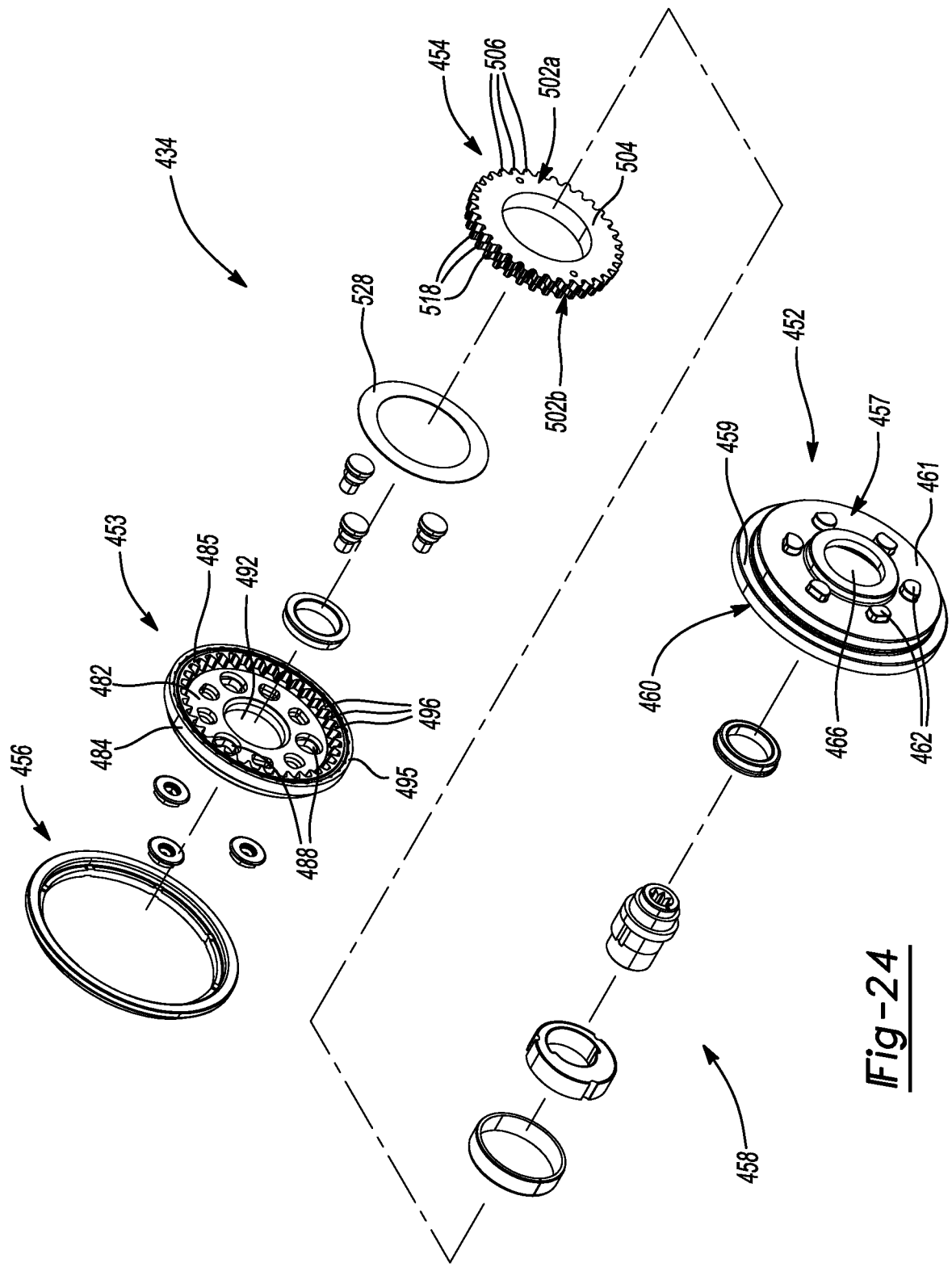
FIG. 24 is an exploded view of an alternate recliner mechanism according to the principles of the present disclosure.
Figure 25:
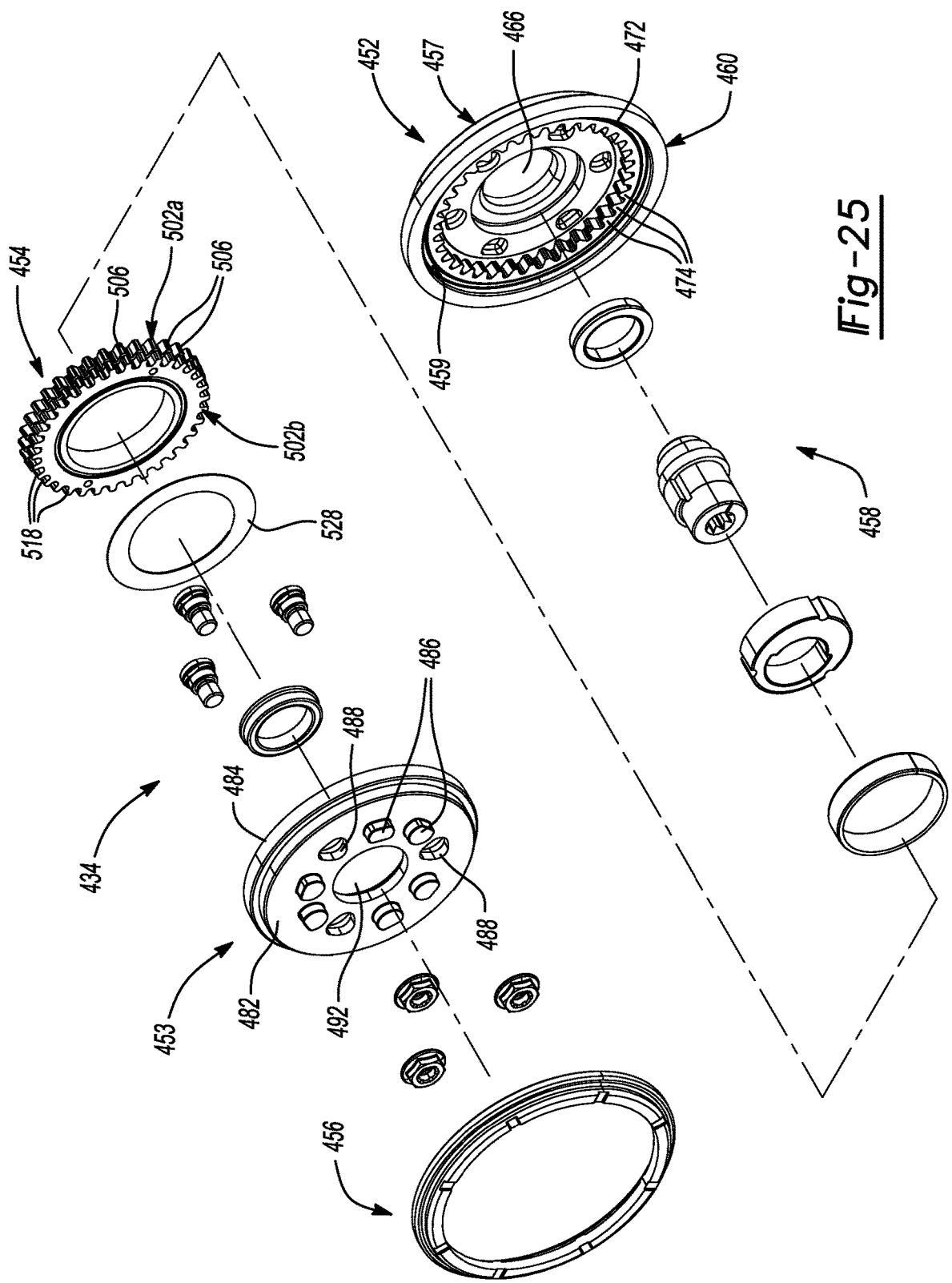
FIG. 25 is another exploded view of the recliner mechanism shown in FIG. 24.

The recliner mechanism 434 may be mounted to a seatback frame (not shown) and a seat bottom frame (not shown) and may selectively permit relative rotation between a seatback (not shown) and a seat bottom (not shown). As shown in FIGS. 24 and 25, the recliner mechanism 434 may include a first locking plate 452, a second locking plate 453, a locking ring assembly 454, an encapsulating ring 456 and a locking assembly 458.

The first locking plate 452 may be rotationally fixed to the seatback frame and may be generally a circular shape. The first locking plate 452 may include an inner section 457, an intermediate section 459 and a rim or outer section 460. The inner section 457 may include a plate body 461 having projections 462 extending from a surface thereof. The projections 462 may be received in respective second openings of the seatback frame, thereby rotationally fixing the first locking plate 452 and the seatback. The projections 462 may also be disposed around a stepped opening 466 extending through a center portion of the plate body 461.

The intermediate section 459 may include an inner diametrical surface 472 having teeth 474 formed thereon. As shown in FIGS. 30, 32, 35 and 36, each tooth 474 may have a conical involute profile (i.e., beveloid profile). That is, each tooth 474 is tapered from a first end 476 toward a second end 478 in an axial direction (i.e., a direction parallel to a rotational axis of the recliner mechanism 434). In this way, a thickness of each tooth 474 at the first end 476 is thicker than a thickness of each tooth 474 at the second end 478, and a height of each tooth 474 at the first end 476 is greater than a height of each tooth 474 at the second end 478. Stated another way, the thickness and the height of each tooth 474 decreases from the first end 476 toward the second end 478. Each tooth 474 may also include involute helicoid shaped surfaces 480a, 480b.

Figure 26:
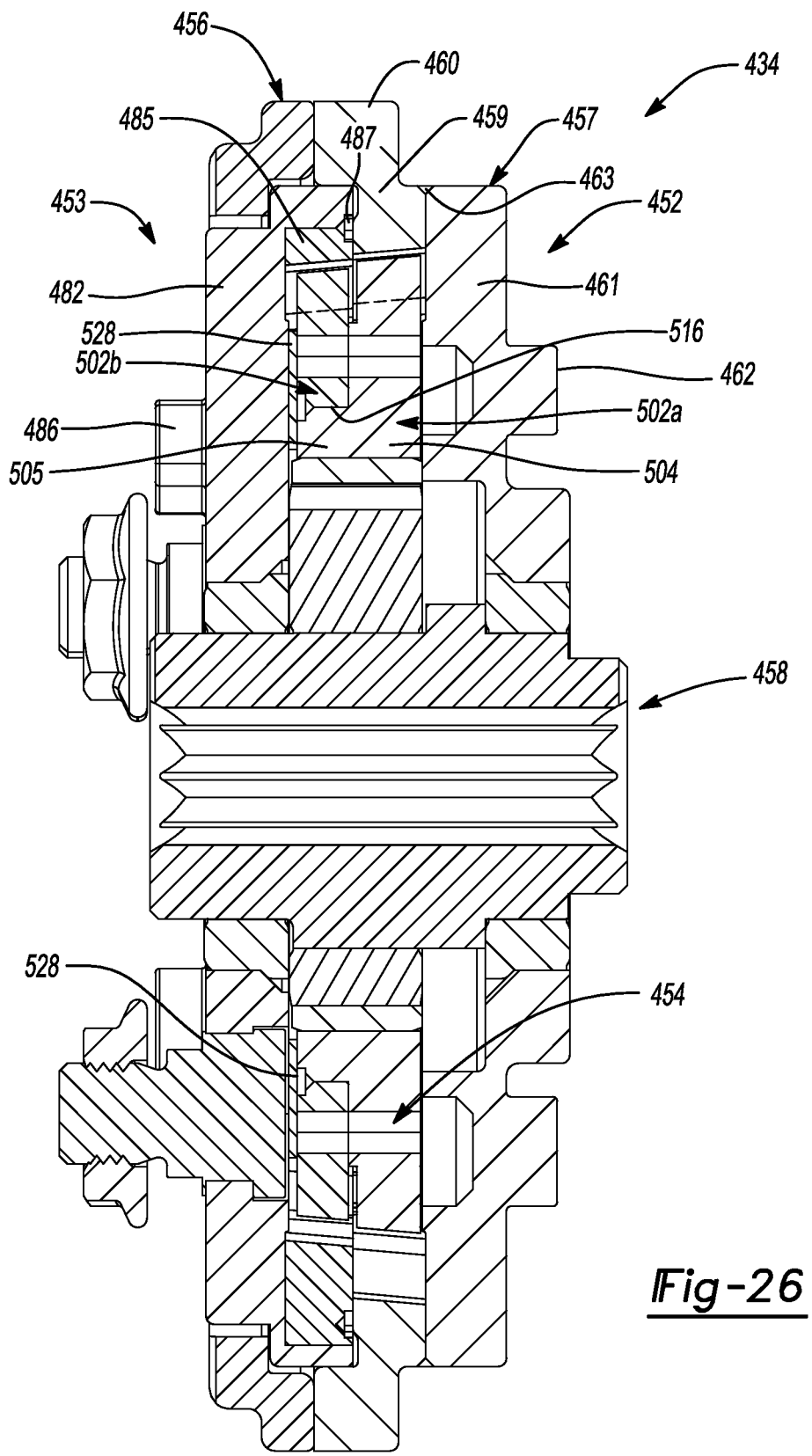
FIG. 26 is a cross-sectional view of the recliner mechanism shown in FIG. 24.

As shown in FIGS. 24-26, the rim 460 may extend around a periphery of the intermediate section 459. It should be understood that the intermediate section 459 and the rim 460 may be manufactured as one piece and subsequently welded (e.g., laser welded) via a weld 463 to the inner section 457. In this way, the conical involute profile of the teeth 474 are formed prior to welding the rim 460 and the intermediate section 459 to the inner section 457.

The second locking plate 453 may be rotationally fixed to the seat bottom frame and may be generally a circular shape. The second locking plate 453 may include a plate body 482 and a rim 484. The plate body 482 may include projections 486 and a plurality of apertures or openings 488. The projections 486 may extend from a surface of the plate body 482 and may be received in respective openings of the seat bottom frame, thereby rotationally fixing the second locking plate 453 and the seat bottom. The projections 486 may also be disposed around a central opening 492 extending through the center of the plate body 482. The plurality of apertures 488 may extend through the plate body 482 and may also be disposed around the central opening 492. Each aperture 488 may be disposed between two of the projections 486 and may include a first portion and a second portion. The first portion may have a circular-shape and the second portion may have a trilobular-shape.

The rim 484 may extend 360 degrees around a periphery of the plate body 482. A ring 485 may be welded (e.g., laser welded) to an inner diametrical surface of the rim 484 via a weld 487 and may include teeth 496 that extends 360 degrees around an inner diametrical surface 495 thereof (FIG. 24). Each tooth 496 may have a conical involute profile (i.e., beveloid profile). That is, each tooth 496 is tapered from a first end 497 toward a second end 498 in the axial direction (i.e., the teeth 496 are tapered in the same direction as teeth 474). In this way, a thickness of each tooth 496 at the first end 497 is thicker than a thickness of each tooth 496 at the second end 498, and a height of each tooth 496 at the first end 497 is greater than a height of each tooth 496 at the second end 498. Stated another way, the thickness and the height of each tooth 496 decreases from the first end 497 toward the second end 498. Each tooth 496 may also include involute helicoid shaped surfaces 500a, 500b.

Figure 26A:
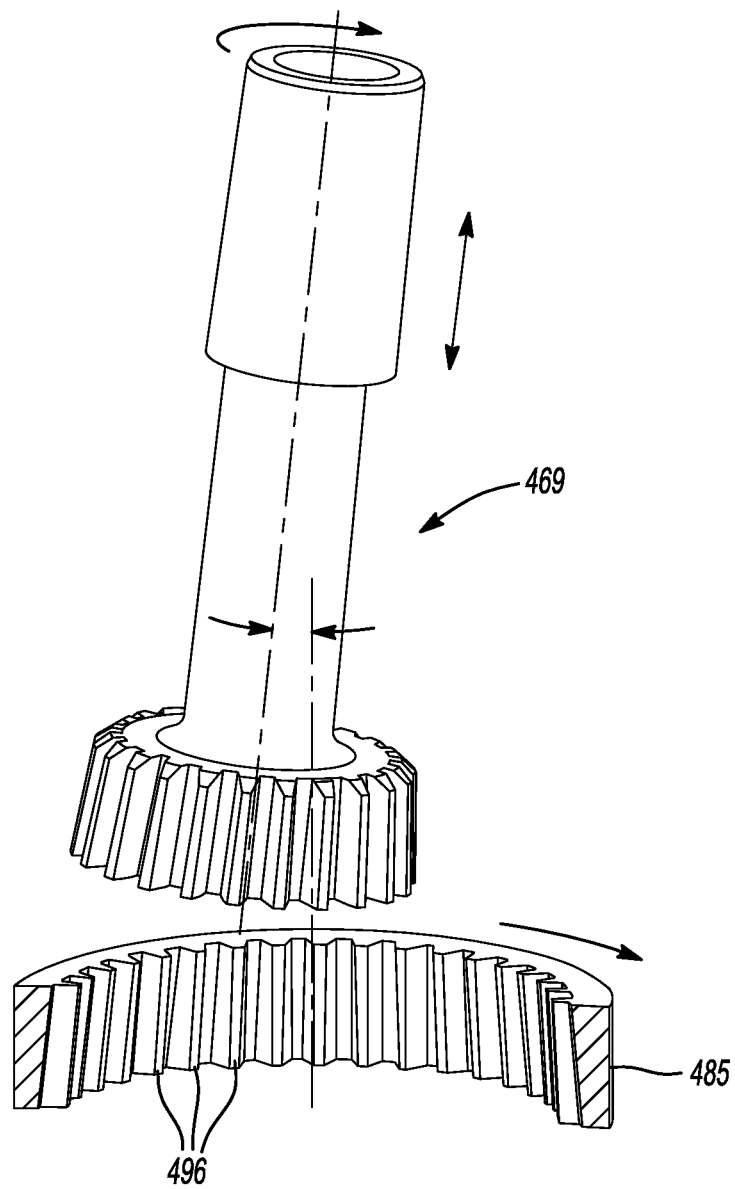
FIG. 26a is a perspective view of a tool forming the conical involute profile of teeth of a ring of the second locking plate.

It should be understood that the ring 485 may be manufactured as one piece and subsequently welded (e.g., laser welded) via the weld 487 to the rim 484. In this way, the conical involute profile of the teeth 496 are formed prior to welding the rim 484 and the ring 485. For example, as shown in FIG. 26a, a tool 469 may form the conical involute profile of the teeth 496 of the ring 485. The tool 469 may rotate and move back and forth along a longitudinal axis thereof without interference from the second locking plate 453. Once the conical involute profile of the teeth 496 is formed, the ring 485 may be welded to the rim 484.

The locking ring assembly 454 may be disposed between the first and second locking plates 452, 453. The locking ring assembly 454 may include a first locking ring 502a and a second locking ring 502b. The first locking ring 502a may include a body portion 504 and a hub portion 505 extending axially from the body portion 504 (FIG. 26). In some configurations, the locking plates 452, 453 and locking rings 502a, 502b may be manufactured using the same material specification (e.g., ASTM A506 SAE 4140, CRS steel, with heat treatment as oil quenched and tempered at 54-58 HRC).

Figure 27:
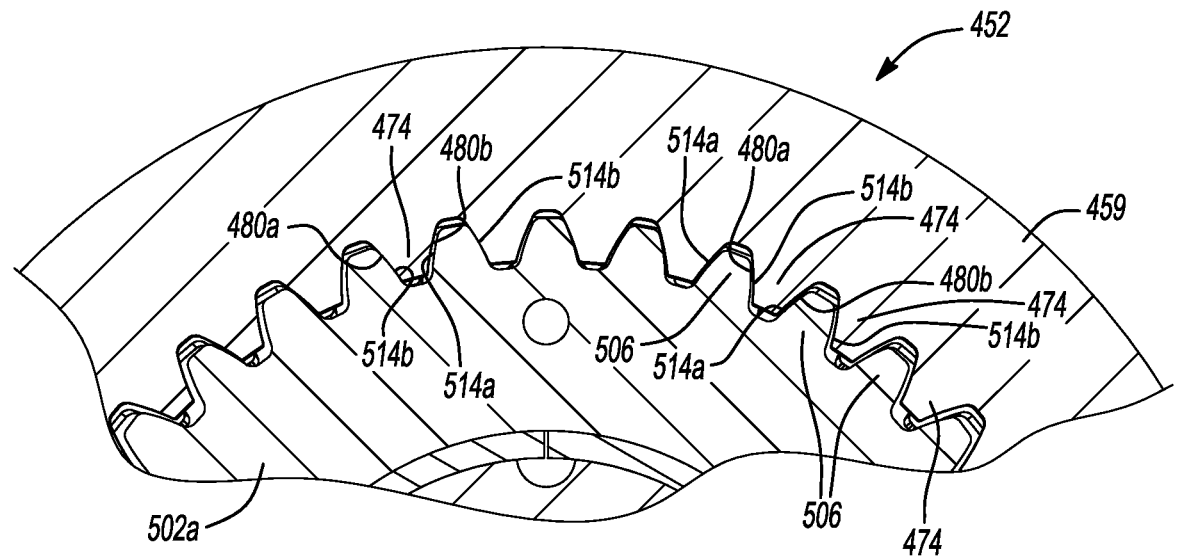
FIG. 27 is a partial cross-sectional view of the recliner mechanism of FIG. 24 showing some teeth of a first locking plate of the recliner mechanism in meshing engagement with some teeth of a first locking ring of the recliner mechanism.

Teeth 506 may extend 360 degrees around an outer diametrical surface of the body portion 504 and may be in meshing engagement with the teeth 474 of the first locking plate 452 (FIG. 27). Each tooth 506 may have a conical involute profile (i.e., beveloid profile). That is, each tooth 506 is tapered from a first end 510 toward a second end 512 in the axial direction (i.e., the teeth 506 are tapered in the same direction as teeth 474, 496). In this way, a thickness of each tooth 506 at the first end 510 is thicker than a thickness of each tooth 506 at the second end 512, and a height of each tooth 506 at the first end 510 is greater than a height of each tooth 506 at the second end 512. Stated another way, the thickness and the height of each tooth 506 decreases from the first end 510 toward the second end 512. Each tooth 506 may also include involute helicoid shaped surfaces 514a, 514b. Some surfaces 514a of the teeth 506 in meshing engagement with teeth 474 may contact surface 480b of a respective tooth 474 and some surfaces 514b of the teeth 506 in meshing engagement with teeth 474 may contact surface 48a of a respective tooth 474. In this way, chuck (e.g., free play, backlash, etc.) between the first locking plate 452 and the first locking ring 502a is eliminated.

Figure 28:
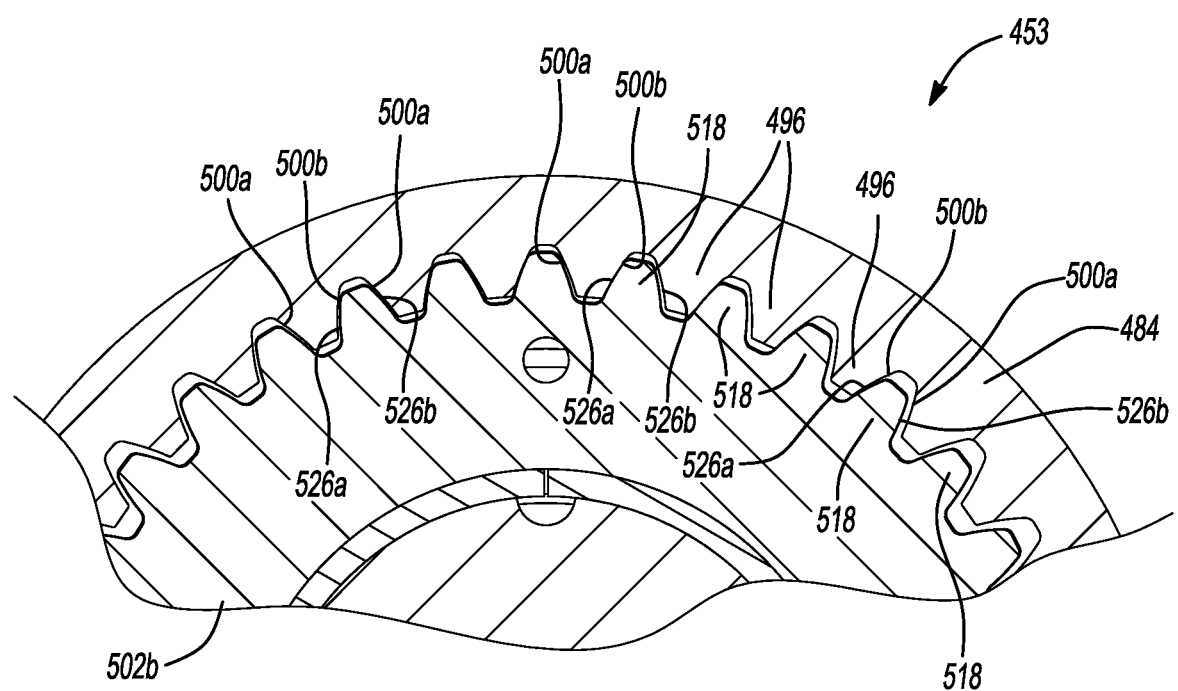
FIG. 28 is a partial cross-sectional view of the recliner mechanism of FIG. 24 showing some teeth of a second locking plate of the recliner mechanism in meshing engagement with some teeth of a second locking ring of the recliner mechanism.
Figure 29:
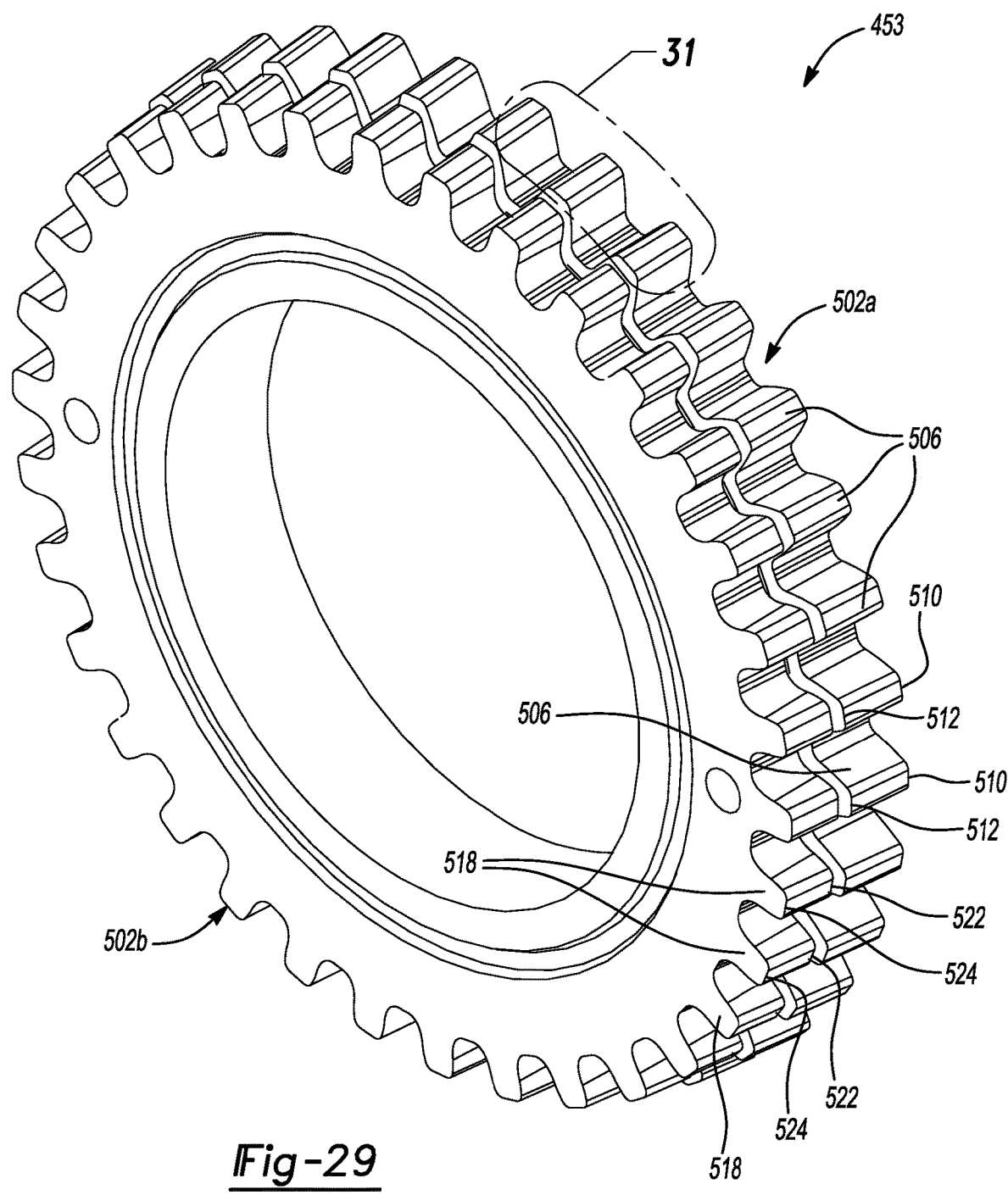
FIG. 29 is a perspective view of a locking ring assembly of the recliner mechanism of FIG. 24.
Figure 31:
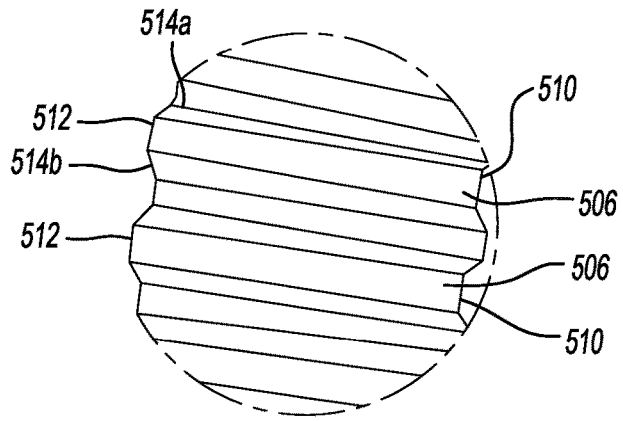
FIG. 31 is a close-up view of the area indicated as 31 in FIG. 29.
Figure 32:
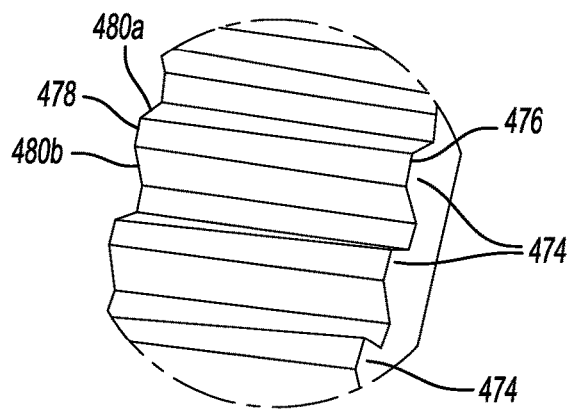
FIG. 32 is a close-up view of the area indicated as 32 in FIG. 30.

As shown in FIG. 26, the second locking ring 502b may be attached (e.g., welded) to an outer diametrical surface 516 of the hub portion 505 so that the first and second locking rings 502a, 502b are rotationally fixed to each other. The second long ring 502b may also include teeth 518 extending 360 degrees around an outer diametrical surface. Teeth 518 may be spaced apart from the teeth 506 of the first locking ring 502a. As shown in FIG. 28, the teeth 518 may also be in meshing engagement with the teeth 496 of the second locking plate 453 and may have a conical involute profile (i.e., beveloid profile). That is, each tooth 518 is tapered from a first end 522 toward a second end 524 in the axial direction (i.e., the teeth 518 are tapered in the same direction as teeth 474, 496, 506). In this way, a thickness of each tooth 518 at the first end 522 is thicker than a thickness of each tooth 518 at the second end 524, and a height of each tooth 518 at the first end 522 is greater than a height of each tooth 518 at the second end 524. Stated another way, the thickness and the height of each tooth 518 decreases from the first end 522 toward the second end 524. Each tooth 518 may also include involute helicoid shaped surfaces 526a, 526b. Some surfaces 526a of the teeth 518 in meshing engagement with teeth 496 may contact surface 500b of a respective tooth 496 and some surfaces 526b of the teeth 518 in meshing engagement with teeth 496 may contact surface 500a of a respective tooth 496. In this way, chuck (i.e., free play) between the second locking plate 453 and the second locking ring 502b is eliminated.

As shown in FIGS. 24 and 25, a biasing ring 528 (e.g., a wavy spring washer) may be disposed between the plate body 482 of the second locking plate 453 and the locking ring assembly 454. The biasing ring 528 may axially bias the first and second locking rings 502a, 502b so that the teeth 506 of the first locking ring 502a maintains meshing engagement with the teeth 474 of the of the first locking plate 452 and the teeth 518 of the second locking ring 502b maintains meshing engagement with the teeth 496 of the second locking plate 453. In this way, the elimination of chuck (i.e., free play) between the first and second locking plates 452, 453 and the first and second locking rings 502a, 502b, respectively, is maintained.

The encapsulating ring 456 may be attached (e.g., by laser welding) to the first locking plate 452 to hold the recliner mechanism 434 together and also to cover a periphery of second locking plate 453, thereby preventing debris and fluid from infiltrating and damaging internal components of the recliner mechanism 434.

The structure and function of the locking assembly 458 may be similar or identical to that of the locking assemblies 56, 258 described above, and therefore, will not be described again in detail.

With reference to FIGS. 37-43, another recliner mechanism 634 is provided. The structure and function of the recliner mechanism 434 may be similar or identical to the recliner mechanism 24, 234, 434 described above, apart from any exception noted below.

Figure 37:
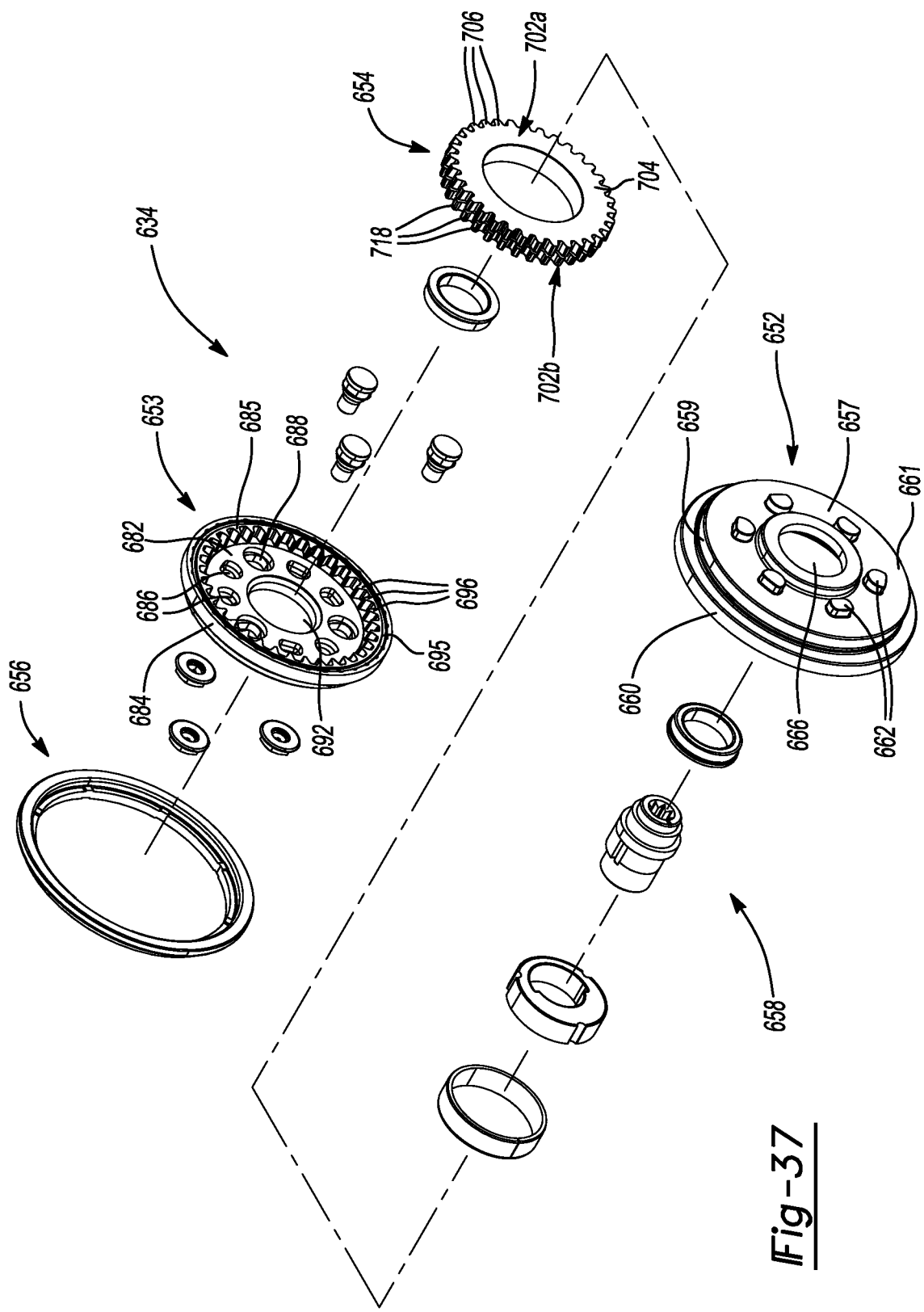
FIG. 37 is an exploded view of an alternate recliner mechanism according to the principles of the present disclosure.
Figure 38:
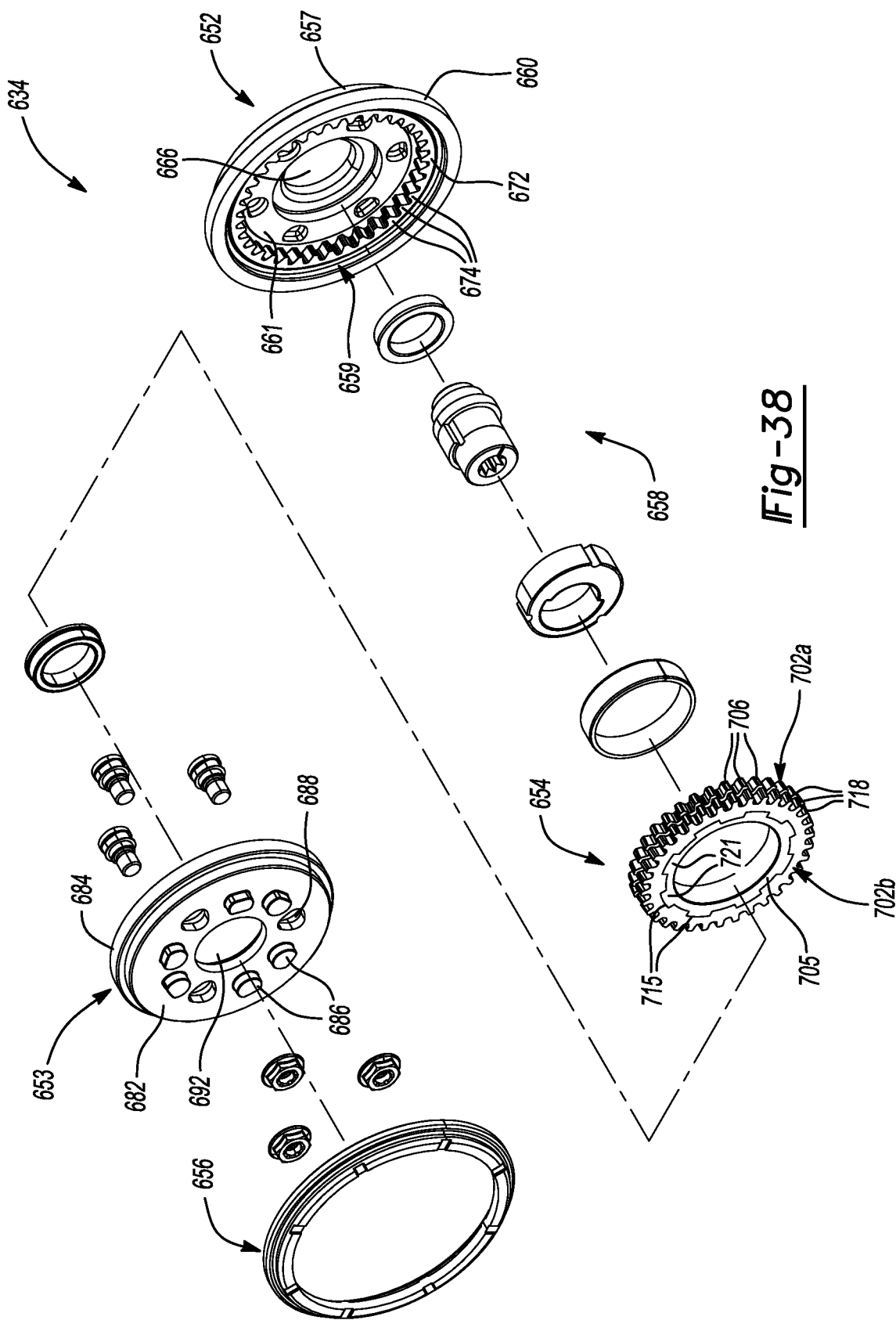
FIG. 38 is another exploded view of the recliner mechanism shown in FIG. 33.

The recliner mechanism 634 may be mounted to a seatback frame (not shown) and a seat bottom frame (not shown) and may selectively permit relative rotation between a seatback (not shown) and a seat bottom (not shown). As shown in FIGS. 37 and 38, the recliner mechanism 634 may include a first locking plate 652, a second locking plate 653, a locking ring assembly 654, an encapsulating ring 656 and a locking assembly 658.

The first locking plate 652 may be rotationally fixed to the seatback frame and may be generally a circular shape. The first locking plate 652 may include an inner section 657, an intermediate section 659 and a rim or outer section 660. The inner section 657 may include a plate body 661 having projections 662 extending from a surface thereof. The projections 662 may be received in respective second openings of the seat back frame, thereby rotationally fixing the first locking plate 652 and the seatback. The projections 662 may also be disposed around a stepped opening 666 extending through a center portion of the plate body 661.

The intermediate section 659 may include an inner diametrical surface 672 having teeth 674 formed thereon. Each tooth 674 may have a conical involute profile (i.e., beveloid profile). That is, each tooth 674 is tapered from a first end 676 toward a second end 678 in a first axial direction X1 (i.e., a direction parallel to a rotational axis of the recliner mechanism 634). In this way, a thickness of each tooth 674 at the first end 676 is thicker than a thickness of each tooth 674 at the second end 678, and a height of each tooth 674 at the first end 676 is greater than a height of each tooth 674 at the second end 678. Stated another way, the thickness and the height of each tooth 674 decreases from the first end 676 toward the second end 678. Each tooth 674 may also include involute helicoid shaped surfaces 680a, 680b.

Figure 39:
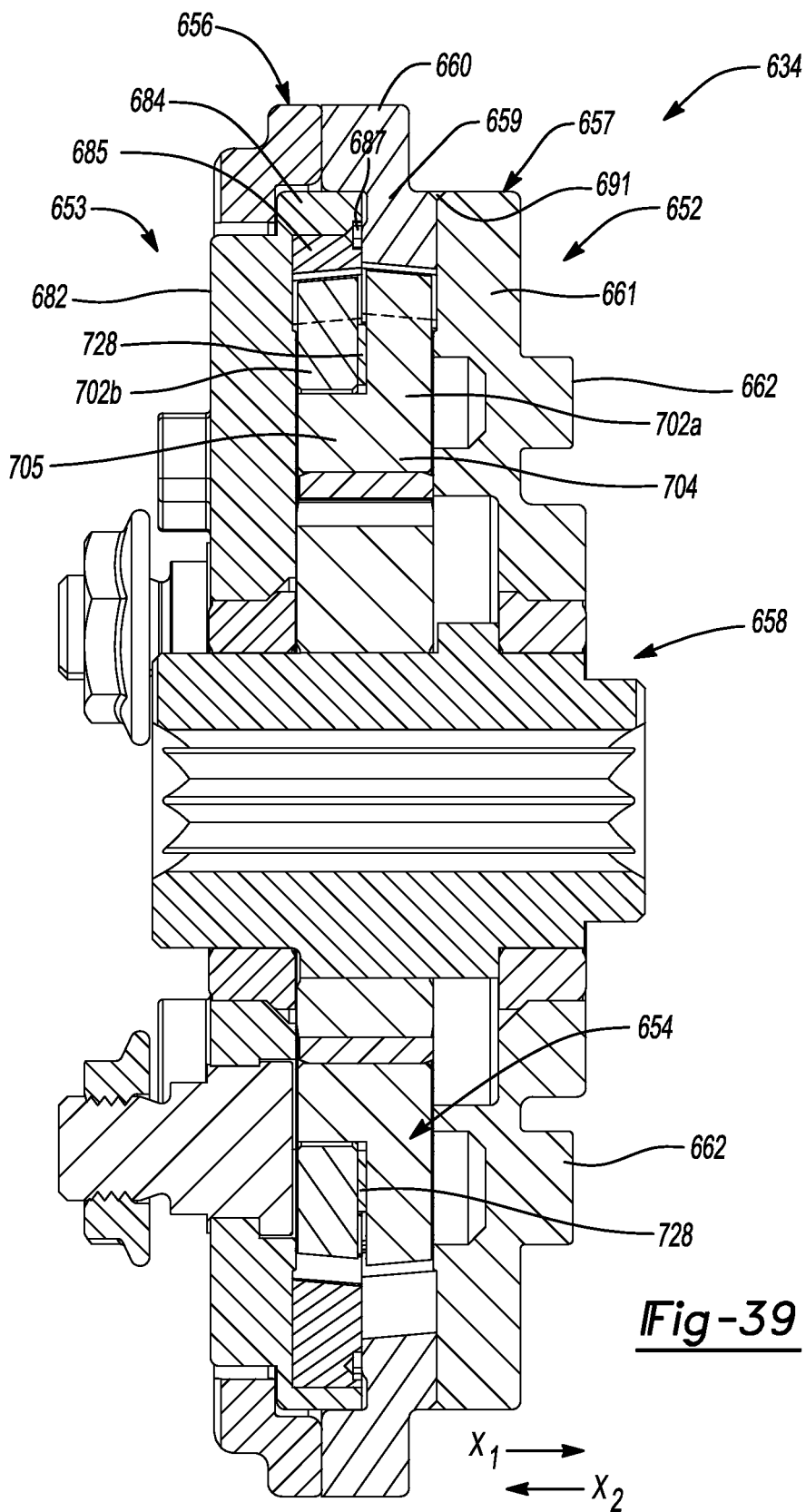
FIG. 39 is a cross-sectional view of the recliner mechanism shown in FIG. 33.

As shown in FIGS. 37-39, the rim 660 may extend around a periphery of the intermediate section 659. It should be understood that the intermediate section 659 and the rim 660 may manufactured as one piece and subsequently welded (e.g., laser welded) to the inner section 657 via a weld 691. In this way, the conical involute profile of the teeth 674 are formed prior to welding the rim 660 and the intermediate section 659 to the inner section 657.

The second locking plate 653 may be rotationally fixed to the seat bottom frame and may be generally a circular shape. The second locking plate 653 may include a plate body 682 and a rim 684. The plate body 682 may include projections 686 and a plurality of apertures or openings 688. The projections 686 may extend from a surface of the plate body 682 and may be received in respective openings of the seat bottom frame, thereby rotationally fixing the second locking plate 653 and the seat bottom. The projections 686 may also be disposed around a central opening 692 extending through a center of the plate body 682. The plurality of apertures 688 may extend through the plate body 682 and may also be disposed around the central opening 692. Each aperture 688 may be disposed between two of the projections 686 and may include a first portion and a second portion. The first portion may have a circular-shape and the second portion may have a trilobular-shape.

The rim 684 may extend 360 degrees around a periphery of the plate body 682. A ring 685 may be welded (e.g., laser welded) to the rim 684 via a weld 687 and may include teeth 696 that extends 360 degrees around an inner diametrical surface 695 thereof (FIG. 37). Each tooth 696 may have a conical involute profile (i.e., beveloid profile). That is, each tooth 696 is tapered from a first end 697 toward a second end 698 in a second axial direction X2 that is opposite the first axial direction X1. In this way, a thickness of each tooth 696 at the first end 697 is thicker than a thickness of each tooth 696 at the second end 698, and a height of each tooth 696 at the first end 697 is greater than a height of each tooth 696 at the second end 698. Stated another way, the thickness and the height of each tooth 696 decreases from the first end 697 toward the second end 698. Each tooth 696 may also include involute helicoid shaped surfaces 700a, 700b.

It should be understood that the ring 685 may be manufactured as one piece and subsequently welded (e.g., laser welded) via the weld 687 to the rim 684. In this way, the conical involute profile of the teeth 696 are formed prior to welding the rim 684 and the ring 685.

Figure 33:
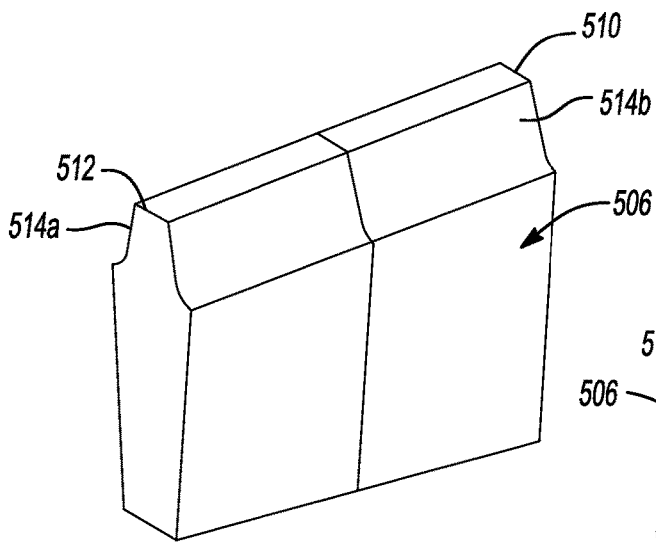
FIG. 33 is a partial perspective view of a tooth of the first locking ring.
Figure 34:
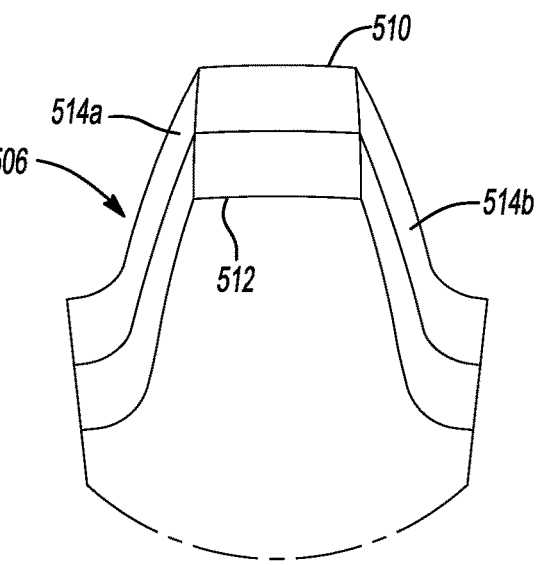
FIG. 34 is a front view of the tooth of the first locking ring.
Figure 35:
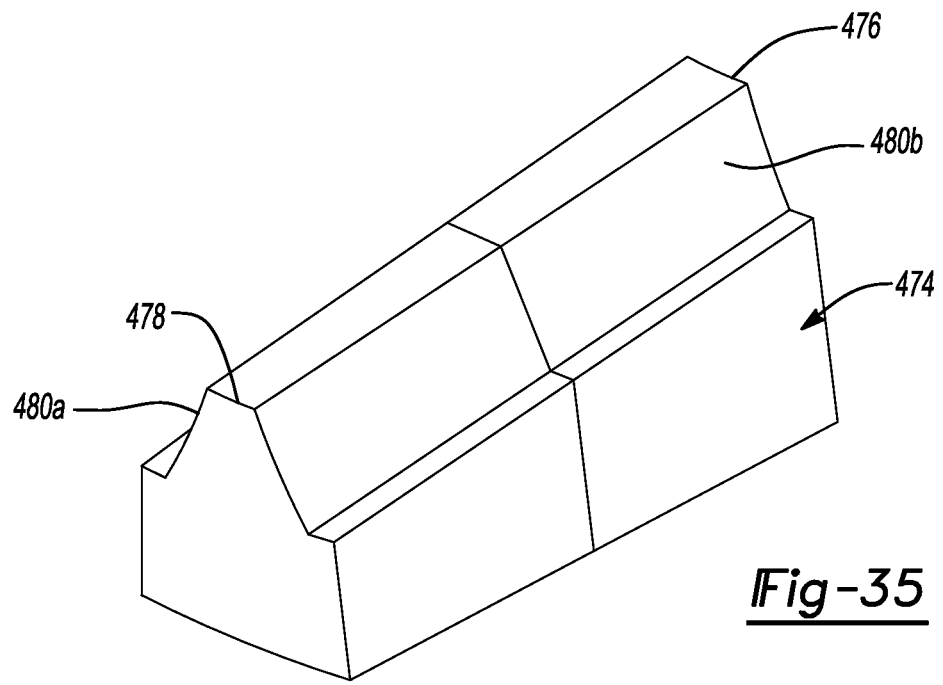
FIG. 35 is a partial perspective view of a tooth of the first locking plate.
Figure 36:
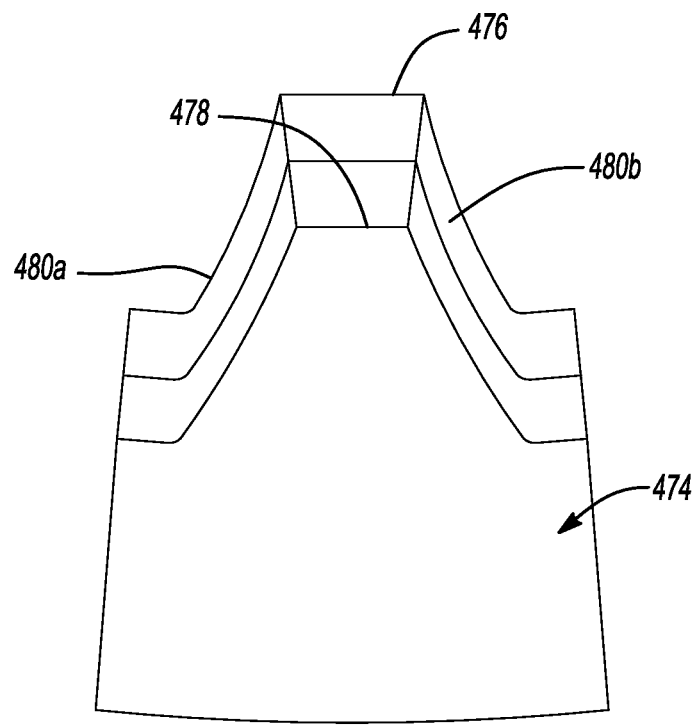
FIG. 36 is a front view of the tooth of the first locking plate.

As shown in FIGS. 33 and 34, the locking ring assembly 654 may be disposed between the first and second locking plates 652, 653. The locking ring assembly 654 may include a first locking ring 702a and a second locking ring 702b. The first locking ring 702a may include a body portion 704 and a hub portion 705 extending axially from the body portion 704 (FIG. 39). In some configurations, the locking plates 652, 653 and locking rings 702a, 702b may be manufactured using the same material specification (e.g., ASTM A506 SAE 4140, CRS steel, with heat treatment as oil quenched and tempered at 54-58 HRC).

Figure 40:
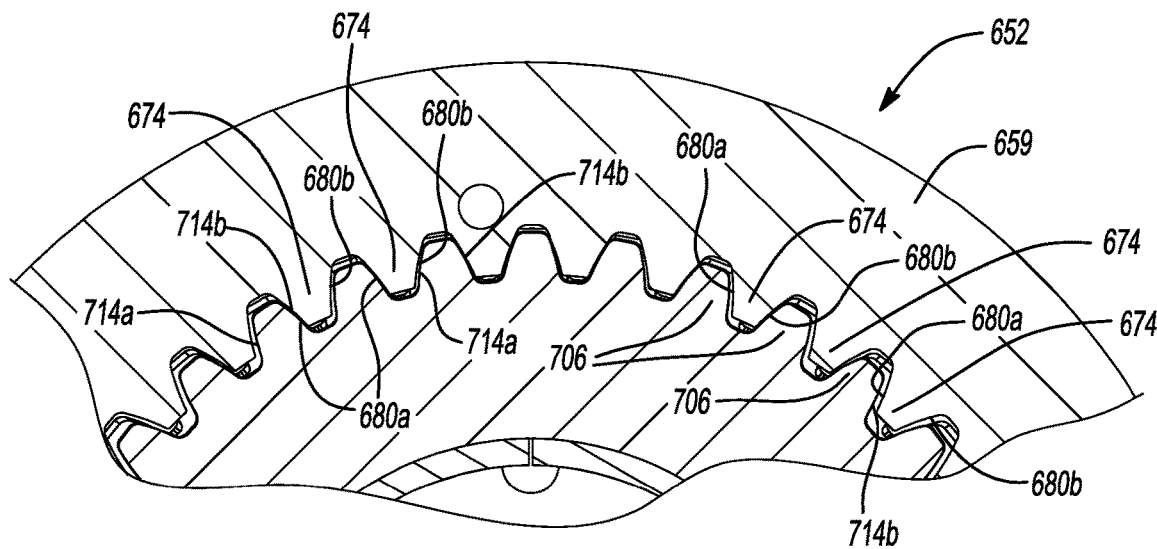
FIG. 40 is a partial cross-sectional view of the recliner mechanism of FIG. 37 showing some teeth of a first locking plate of the recliner mechanism in meshing engagement with some teeth of a first locking ring of the recliner mechanism.
Figure 41:
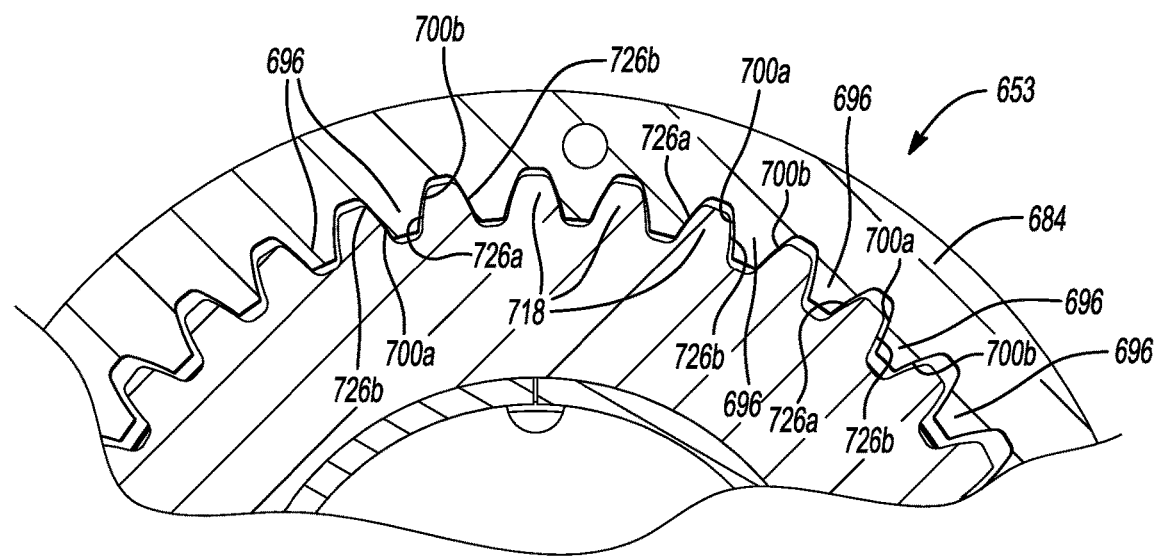
FIG. 41 is a partial cross-sectional view of the recliner mechanism of FIG. 37 showing some teeth of a second locking plate of the recliner mechanism in meshing engagement with some teeth of a second locking ring of the recliner mechanism.

Teeth 706 may extend 360 degrees around an outer diametrical surface of the body portion 704 and may be in meshing engagement with the teeth 674 of the first locking plate 652 (FIG. 40). Each tooth 706 may have a conical involute profile (i.e., beveloid profile). That is, each tooth 706 is tapered from a first end 710 toward a second end 712 in the first axial direction X1 (i.e., the teeth 706 are tapered in the same direction as teeth 674 and in an opposite direction relative to teeth 696). In this way, a thickness of each tooth 706 at the first end 710 is thicker than a thickness of each tooth 706 at the second end 712, and a height of each tooth 706 at the first end 710 is greater than a height of each tooth 706 at the second end 712. Stated another way, the thickness and the height of each tooth 706 decreases from the first end 710 toward the second end 712. Each tooth 706 may also include involute helicoid shaped surfaces 714a, 714b. Some surfaces 714a of the teeth 706 in meshing engagement with teeth 674 may contact surface 680b of a respective tooth 674 and some surfaces 714b of the teeth 706 in meshing engagement with teeth 674 may contact surface 680a of a respective tooth 674. In this way, chuck (i.e., free play) between the first locking plate 652 and the first locking ring 702a is eliminated.

Figure 42:
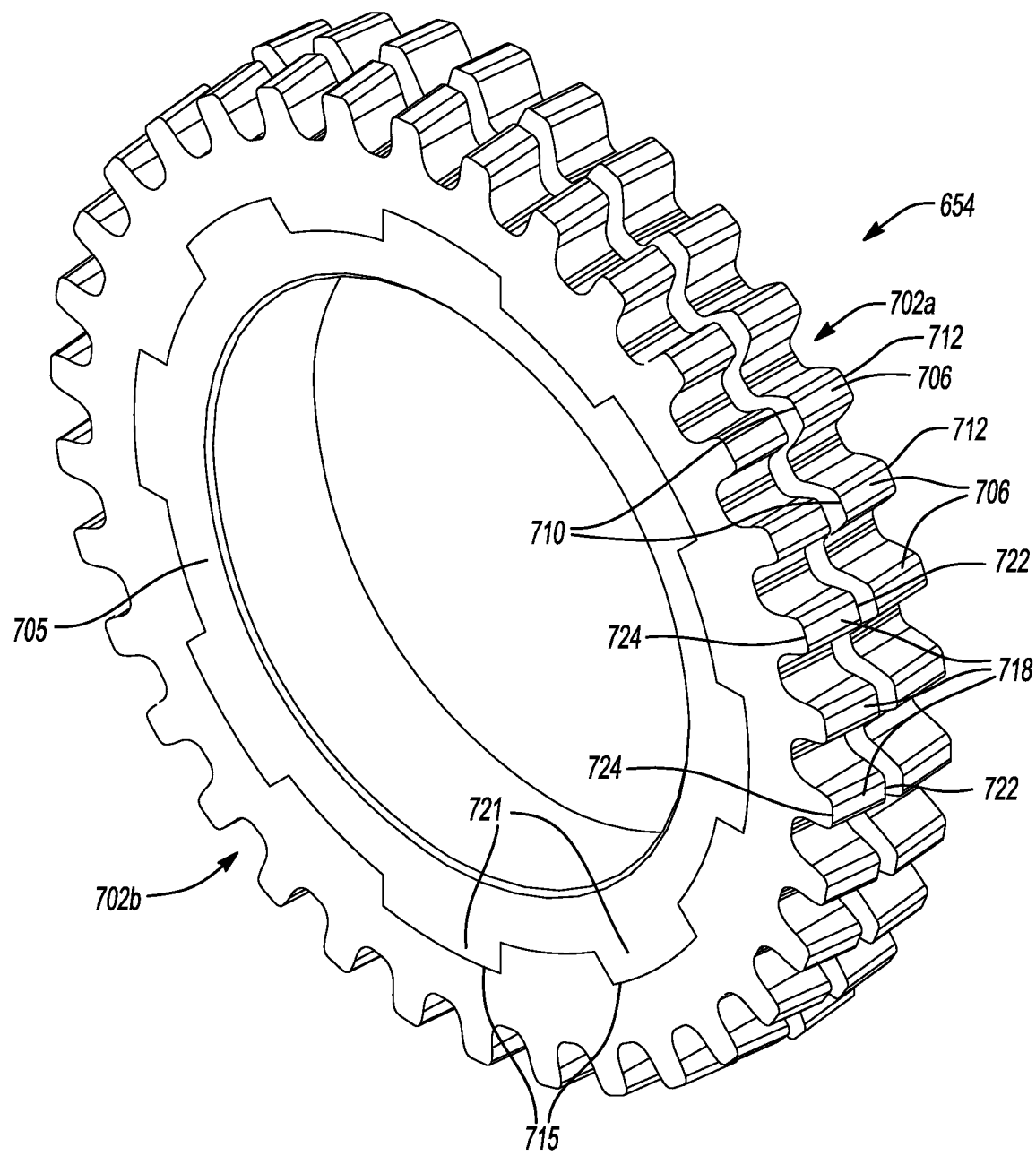
FIG. 42 is a perspective view of a locking ring assembly of the recliner mechanism of FIG. 37.
Figure 43:
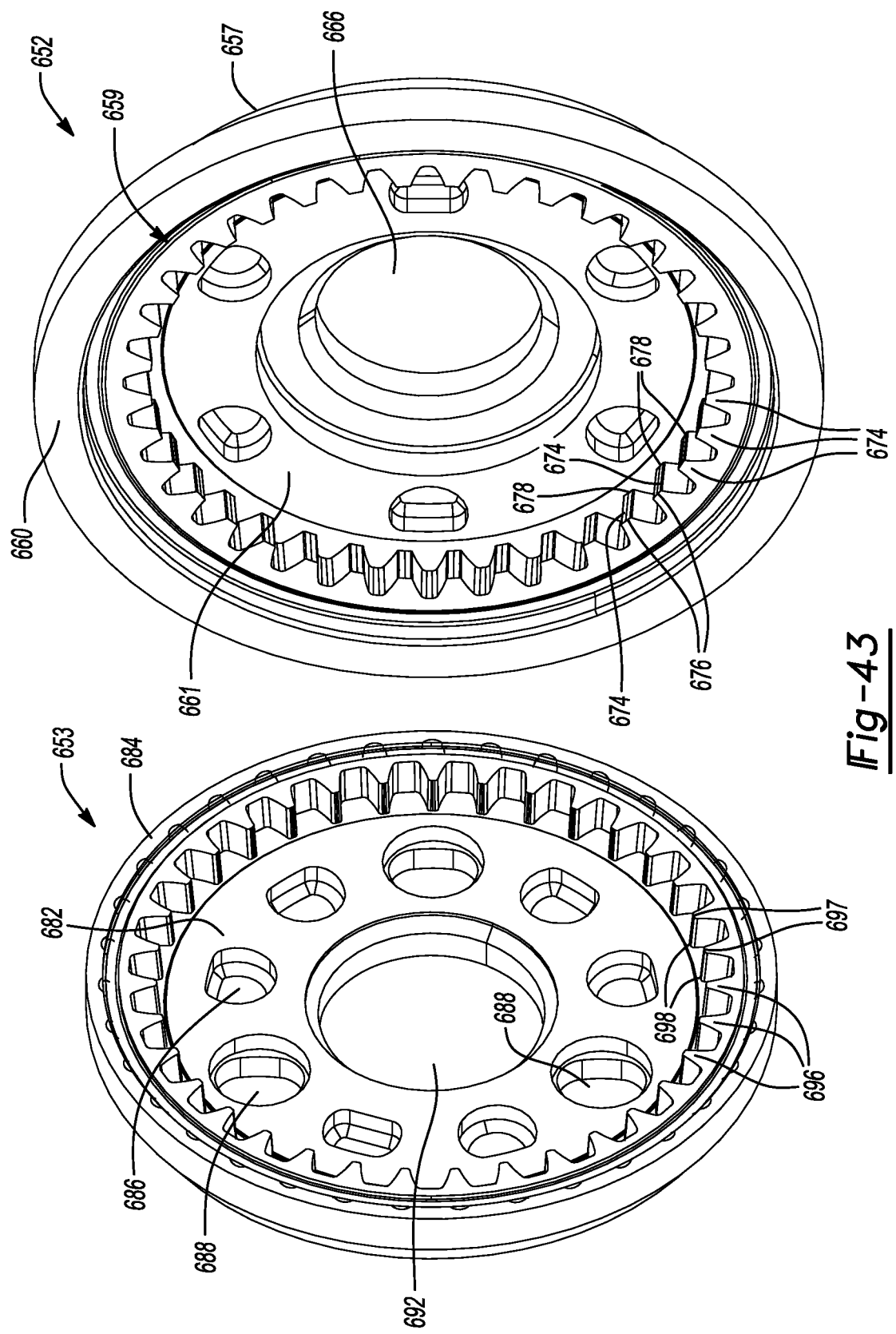
FIG. 43 is a perspective view of the first and second locking plates of the recliner mechanism of FIG. 37.

As shown in FIGS. 38 and 42, the second locking ring 702b may include rectangular-shaped grooves 715 that are formed in an inner diametrical surface and that receive rectangular-shaped teeth 721 formed on an outer diametrical surface of the hub portion 705. In this way, the first and second locking rings 702a, 702b are rotationally fixed to each other.

The second long ring 702b may also include teeth 718 extending 360 degrees around an outer diametrical surface. As shown in FIGS. 37 and 38, teeth 718 may be spaced apart from the teeth 706 of the first locking ring 702a. The teeth 718 may also be in meshing engagement with the teeth 696 of the second locking plate 653 and may have a conical involute profile (i.e., beveloid profile). That is, each tooth 718 is tapered from a first end 722 toward a second end 724 in the second axial direction X2 (i.e., the teeth 718 are tapered in the same direction as teeth 696 and in an opposite direction than the teeth 674, 706). In this way, a thickness of each tooth 718 at the first end 722 is thicker than a thickness of each tooth 718 at the second end 724, and a height of each tooth 718 at the first end 722 is greater than a height of each tooth 718 at the second end 724. Stated another way, the thickness and the height of each tooth 718 decreases from the first end 722 toward the second end 724. Each tooth 718 may also include involute helicoid shaped surfaces 726a, 726b. Some surfaces 726a of the teeth 718 in meshing engagement with teeth 696 may contact surface 700b of a respective tooth 696 and some surfaces 726b of the teeth 718 in meshing engagement with teeth 696 may contact surface 700a of a respective tooth 696. In this way, chuck (i.e., free play) between the second locking plate 653 and the first locking ring 702b is eliminated.

As shown in FIG. 39, a biasing ring 728 (e.g., a wavy spring washer) may be disposed between the first and second locking rings 702a, 702b. The biasing ring 728 may axially bias the first and second locking rings 702a, 702b so that the teeth 706 of the first locking ring 702a maintains meshing engagement with the teeth 674 of the first locking plate 652 and the teeth 718 of the second locking ring 702b maintains meshing engagement with the teeth 696 of the second locking plate 653. Stated another way, the biasing ring 728 axially biases the first and second locking rings 702a, 702b in opposite directions. In this way, the elimination of chuck (i.e., free play) between the first and second locking plates 652, 653 and the first and second locking rings 702a, 702b, respectively, is maintained.

The encapsulating ring 656 may be attached (e.g., by laser welding) to the first locking plate 652 to hold the recliner mechanism 634 together and also to cover a periphery of second locking plate 653, thereby preventing debris and fluid from infiltrating and damaging internal components of the recliner mechanism 634.

The structure and function of the locking assembly 658 may be similar or identical to that of the locking assemblies 56, 258, 458 described above, and therefore, will not be described again in detail.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A recliner mechanism for a seat assembly having a seatback and a seat bottom, the recliner mechanism comprising:
   a first locking plate having a first inner diametrical surface having first teeth formed thereon, the first locking plate including a first aperture extending therethrough;
   a second locking plate having a second inner diametrical surface having second teeth formed thereon;
   a third locking plate having an outer diametrical surface having third teeth formed thereon, wherein some of the third teeth are meshingly engaged with some of the first teeth and some of the second teeth; and
   a first fastener extending through the first aperture and attached to one of the seatback and the seat bottom, the first fastener including an anti-rotational portion that is disposed in the first aperture and prevents the first fastener from rotating relative to the first locking plate.

2. The recliner mechanism of claim 1, wherein the first locking plate includes a plate body and a rim extending around the plate body, and wherein the first aperture extends through the plate body.

3. The recliner mechanism of claim 2, wherein the plate body includes projections extending therefrom and received in openings of a bracket attached to the one of the seat back and the seat bottom.

4. The recliner mechanism of claim 3, wherein the first aperture is disposed between two of the projections.

5. The recliner mechanism of claim 2, wherein the first fastener further includes a locking portion, a threaded portion and a flange portion disposed between the locking portion and the threaded portion, and wherein the locking portion is disposed in the first aperture.

6. The recliner mechanism of claim 5, wherein the locking portion and the flange portion cooperate with the plate body to prevent axial movement of the first fastener.

7. The recliner mechanism of claim 6, wherein the threaded portion of the first fastener extends from the flange portion and is threadably secured to the one of the seatback and the seat bottom.

8. The recliner mechanism of claim 6, wherein the first aperture includes a first section having a first shape and a second section having a second shape that is different from the first shape, and wherein the locking portion is received in the first section and the anti-rotational portion is received in the second section.

9. The recliner mechanism of claim 8, wherein the locking portion is circular-shaped and is received in the first section where the first shape is circular, and wherein the anti-rotational portion is a trilobular-shaped and is received in the second section where the second shape is trilobular.

10. The recliner mechanism of claim 1, wherein the second locking plate includes a second aperture extending therethrough, and wherein a second fastener extends through the second aperture and is attached to the other of the seatback and the seat bottom.

11. The recliner mechanism of claim 10, wherein the second locking plate includes a third aperture extending therethrough, and wherein a third fastener extends through the second aperture and is attached to the other of the seatback and the seat bottom.

12. The recliner mechanism of claim 10, wherein the second fastener includes an anti-rotational portion that is disposed in the second aperture and prevents the second fastener from rotating relative to the second locking plate.

13. The recliner mechanism of claim 1, wherein the first fastener extends through a second aperture in the second locking plate.

14. A recliner mechanism for a seat assembly having a seatback and a seat bottom, the recliner mechanism comprising:
a first locking plate coupled to one of the seatback and the seat bottom and having a first inner diametrical surface having first teeth formed thereon, the first locking plate defining a first recess;
a second locking plate coupled to the other of the seatback and the seat bottom and having a second inner diametrical surface having second teeth formed thereon; and
an encapsulating ring attached to one of the first and second locking plates and defining a second recess that cooperates with the first recess to form a curved slot, wherein the second locking plate includes a protrusion that is received in the slot and is configured to traverse the curved slot.

15. The recliner mechanism of claim 14, wherein the first locking plate includes an intermediate section and a first rim extending at least partially around the intermediate section, and wherein the intermediate section has the first inner diametrical surface having first teeth and the first rim defines the first recess.

16. The recliner mechanism of claim 15, wherein the second locking plate includes a plate body and a second rim extending around the plate body, and wherein the second rim has the second inner diametrical surface having the second teeth and the protrusion extends radially outwardly from a second outer diametrical surface of the second rim.

17. The recliner mechanism of claim 16, wherein the encapsulating ring includes a body and a third rim extending radially outwardly from a periphery of the body, and wherein the third rim defines the second recess.

18. The recliner mechanism of claim 17, wherein the protrusion contacts a first end wall of the slot to limit further rotation of the seatback relative to the seat bottom in a first rotational direction and contacts a second end wall of the slot to limit further rotation of the seatback relative to the seat bottom in a second rotational direction that is opposite the first rotational direction.

19. The recliner mechanism of claim 14, wherein the second locking plate includes a plate body and a rim extending around the plate body, wherein an aperture extends through the plate body, and wherein a fastener extends through the aperture in the plate body and is attached to the other of the seatback and the seat bottom.

20. A recliner mechanism comprising:
a first locking plate having a first inner diametrical surface having first teeth formed thereon;
a second locking plate having a second inner diametrical surface having second teeth formed thereon;
a locking ring assembly having first and second locking rings, the first locking ring having a first outer diametrical surface having third teeth formed thereon and the second locking ring having a second outer diametrical surface having fourth teeth formed thereon, some of the third teeth are meshingly engaged with some of the first teeth and some of the fourth teeth are meshingly engaged with some of the second teeth; and
a biasing ring axially biasing the first and second locking rings into engagement with the first and second locking plates, respectively.

21. The recliner mechanism of claim 20, wherein the first locking ring has a body portion and a hub portion, wherein the body portion has the first outer diametrical surface having the third teeth formed thereon, and wherein the second locking ring is rotationally fixed to the hub portion of the first locking ring.

22. The recliner mechanism of claim 20, wherein the biasing ring is disposed between the second locking plate and the locking ring assembly to bias the first and second locking plates in a same axial direction.

23. The recliner mechanism of claim 20, wherein the biasing ring is disposed between the first and second locking rings to bias the first and second locking plates in opposite axial directions.

24. The recliner mechanism of claim 20, wherein the first, second, third and fourth teeth each have a conical involute profile that are tapered in a same axial direction.

25. The recliner mechanism of claim 24, wherein the first teeth and the third teeth are tapered in a first axial direction, and wherein the second teeth and the fourth teeth are tapered in a second axial direction that is opposite of the first axial direction.

26. The recliner mechanism of claim 20, wherein the second locking plate includes a plate body and a rim extending around the plate body, wherein an aperture extends through the plate body, and wherein a fastener extends through the aperture in the plate body and is attached to one a seatback and a seat bottom.

* * * * *